US011578165B2

(12) United States Patent
Salsman

(10) Patent No.: US 11,578,165 B2
(45) Date of Patent: *Feb. 14, 2023

(54) METHODS OF MAKING FOAMS EXHIBITING DESIRED PROPERTIES FROM AROMATIC POLYESTER POLYETHER POLYOLS DERIVED FROM POLYETHYLENE TEREPHTHALATES AND FOAMS MADE THEREFROM

(71) Applicant: Talaco Holdings, LLC, Lawrenceville, GA (US)

(72) Inventor: Robert Keith Salsman, Hoschton, GA (US)

(73) Assignee: Talaco Holdings, LLC, Lawrenceville, GA (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/748,019

(22) Filed: Jan. 21, 2020

(65) Prior Publication Data

US 2020/0231735 A1 Jul. 23, 2020

Related U.S. Application Data

(60) Provisional application No. 62/794,794, filed on Jan. 21, 2019.

(51) Int. Cl.

| | | |
|---|---|---|
| C08G 18/08 | (2006.01) |
| C08G 18/42 | (2006.01) |
| C08G 18/48 | (2006.01) |
| C08G 18/76 | (2006.01) |
| C08G 63/183 | (2006.01) |
| C08G 63/672 | (2006.01) |
| C08G 63/91 | (2006.01) |

(52) U.S. Cl.
CPC ......... C08G 18/14 (2013.01); C08G 18/4213 (2013.01); C08G 18/4887 (2013.01); C08G 63/183 (2013.01); C08G 63/672 (2013.01); C08G 63/916 (2013.01); C08G 2110/0041 (2021.01)

(58) Field of Classification Search
CPC ............ C08G 18/4255; C08G 18/4261; C08G 18/46; C08G 63/46
See application file for complete search history.

(56) References Cited

U.S. PATENT DOCUMENTS

| | | | | | |
|---|---|---|---|---|---|
| 3,009,764 A | * | 11/1961 | Urs | ........................ | C08G 18/10 264/184 |
| 3,304,286 A | * | 2/1967 | Altscher | ............ | C08G 18/4222 528/59 |
| 3,615,972 A | * | 10/1971 | Morehouse, Jr. | .......... | C08J 9/32 156/79 |
| 3,979,867 A | * | 9/1976 | Sowinski | ................ | E04B 7/225 52/309.11 |
| 4,048,104 A | * | 9/1977 | Svoboda | ............ | C08G 18/4213 521/159 |
| 4,223,068 A | * | 9/1980 | Carlstrom | .......... | C08G 18/4213 428/304.4 |
| 4,248,432 A | * | 2/1981 | Hewitt | ............... | A63B 37/0003 273/DIG. 8 |
| 4,439,550 A | * | 3/1984 | Brennan | ............ | C08G 18/4213 521/131 |
| 4,469,824 A | * | 9/1984 | Grigsby, Jr. | ........ | C08G 18/4213 521/173 |
| 4,485,196 A | * | 11/1984 | Speranza | .................. | C08J 11/24 521/172 |
| 4,539,341 A | * | 9/1985 | Hallmark | ............... | B32B 11/048 521/172 |
| 4,604,410 A | * | 8/1986 | Altenberg | .......... | C08G 18/4213 521/172 |
| 4,609,513 A | * | 9/1986 | Israel | ..................... | B27N 3/083 264/109 |
| 4,642,319 A | * | 2/1987 | McDaniel | .......... | C08G 18/4615 521/175 |
| 4,652,591 A | * | 3/1987 | Londrigan | ........... | C08G 63/672 521/172 |

(Continued)

FOREIGN PATENT DOCUMENTS

| | | |
|---|---|---|
| EP | 0558906 A1 | 9/1993 |
| GB | 1266225 A | 3/1972 |

(Continued)

OTHER PUBLICATIONS

Yelisetty, S. S., & Visco, J. D. P. (2009). Solubility of HFC32, HFC125, HFC152a, and HFC143a in Three Polyols. Journal of Chemical & Engineering Data, 54(3), 781-785.

Wagman, David. "Polyurethane Blowing Agents Can Be Environmentally Friendly and Still Offer Superior Insulating Properties." Insights.globalspec.com, Jul. 19, 2018, <http://insights.globalspec.com/article/9362/polyurethane-blowing-agents-can-be-environmentally-friendly-and-still-offer-superior-insulating-properties> Accessed Aug. 15, 2022.

(Continued)

Primary Examiner — Melissa A Rioja
(74) Attorney, Agent, or Firm — Thomas | Horstemeyer, LLP

(57) ABSTRACT

The disclosure relates to methods of making foams comprising aromatic polyester polyether polyol materials derived from the transesterification of polyethylene terephthalate with either glycerin or trimethylolpropane, wherein each of these triols, independently, has a degree of ethoxylation of from 1 to 9. Uses of the foams are further disclosed. The disclosure further relates to selection of blowing agents suitable to generate a selected end use case. Yet further, the disclosure relates to selection of end uses, properties, and environmental profiles of the foams generated according to the methods herein, and selecting formulation variables suitable to obtain the foams.

20 Claims, 1 Drawing Sheet

(56) References Cited

U.S. PATENT DOCUMENTS

| | | | | |
|---|---|---|---|---|
| 4,662,972 A * | 5/1987 | Thompson | | B32B 13/10 |
| | | | | 114/263 |
| 4,758,607 A * | 7/1988 | Hallmark | | C08G 18/4213 |
| | | | | 521/172 |
| 4,791,148 A * | 12/1988 | Riley | | C08G 18/4211 |
| | | | | 521/159 |
| 4,833,182 A * | 5/1989 | Israel | | C08G 18/4208 |
| | | | | 156/288 |
| 4,897,429 A * | 1/1990 | Trowell | | C08G 63/42 |
| | | | | 521/157 |
| 5,252,615 A * | 10/1993 | Rao | | C09D 167/00 |
| | | | | 521/48.5 |
| 5,302,634 A * | 4/1994 | Mushovic | | B29C 44/3446 |
| | | | | 523/219 |
| 5,877,255 A * | 3/1999 | Gerber | | C08J 11/24 |
| | | | | 524/590 |
| 6,008,182 A * | 12/1999 | Salsman | | C11D 3/0021 |
| | | | | 510/283 |
| 6,022,939 A * | 2/2000 | Pudleiner | | C08G 18/4854 |
| | | | | 528/79 |
| 6,592,218 B1 * | 7/2003 | Salsman | | B41M 5/5272 |
| | | | | 347/106 |
| 6,710,095 B2 * | 3/2004 | Araullo-McAdams | | |
| | | | | C08J 9/141 |
| | | | | 521/172 |
| 7,157,139 B2 * | 1/2007 | Salsman | | C08G 18/4252 |
| | | | | 428/308.4 |
| 7,677,022 B2 * | 3/2010 | Chenevert | | A01D 42/005 |
| | | | | 56/320.2 |
| 8,476,364 B2 * | 7/2013 | Salsman | | C08G 63/916 |
| | | | | 524/599 |
| 8,696,966 B2 * | 4/2014 | Smith | | E04B 2/847 |
| | | | | 264/267 |
| 9,062,158 B2 | 6/2015 | Gehringer et al. | | |
| 9,309,439 B2 * | 4/2016 | Varkey | | C08G 18/4288 |
| 9,410,014 B2 | 8/2016 | Salsman | | |
| 9,695,267 B2 | 7/2017 | Williams et al. | | |
| 9,739,066 B2 * | 8/2017 | Bolin | | E04F 13/0866 |
| 9,745,408 B2 * | 8/2017 | Jones | | C08G 18/1858 |
| 9,809,674 B2 * | 11/2017 | Shieh | | C08G 18/72 |
| 10,479,859 B2 * | 11/2019 | Queen | | C08J 9/32 |
| 2003/0148061 A1 * | 8/2003 | Doesburg | | D06N 7/0086 |
| | | | | 428/95 |
| 2003/0225240 A1 * | 12/2003 | Quint | | C08G 18/3228 |
| | | | | 528/60 |
| 2004/0059011 A1 * | 3/2004 | Barber | | C08G 18/4219 |
| | | | | 521/99 |
| 2004/0162359 A1 * | 8/2004 | Barber | | C08G 18/4211 |
| | | | | 521/159 |
| 2007/0093634 A1 | 4/2007 | Salsman et al. | | |
| 2010/0071292 A1 * | 3/2010 | Futterman | | E04F 13/042 |
| | | | | 52/412 |
| 2010/0240785 A1 * | 9/2010 | Hickey | | C08J 9/141 |
| | | | | 521/157 |
| 2010/0311637 A1 * | 12/2010 | Alonso | | C11D 3/505 |
| | | | | 510/349 |
| 2011/0086217 A1 * | 4/2011 | Crain | | C08G 18/381 |
| | | | | 428/305.5 |
| 2012/0142799 A1 * | 6/2012 | Gehringer | | C08G 18/4288 |
| | | | | 521/155 |
| 2012/0259061 A1 * | 10/2012 | Felice | | C08G 18/3228 |
| | | | | 524/591 |
| 2014/0213677 A1 | 7/2014 | Jimenez et al. | | |
| 2015/0025164 A1 * | 1/2015 | Golini | | C08G 18/4833 |
| | | | | 521/107 |
| 2015/0052838 A1 * | 2/2015 | Ritchie | | B32B 27/306 |
| | | | | 52/408 |
| 2016/0053050 A1 * | 2/2016 | Tabor | | C08G 18/6659 |
| | | | | 524/591 |
| 2016/0053058 A1 * | 2/2016 | Tabor | | C08G 18/44 |
| | | | | 521/161 |
| 2016/0200889 A1 | 7/2016 | Parenti et al. | | |
| 2017/0029561 A1 * | 2/2017 | Tabor | | C08G 18/28 |
| 2018/0282469 A1 * | 10/2018 | Golini | | C08G 18/4887 |
| 2020/0031991 A1 * | 1/2020 | Queen | | C08J 9/12 |

FOREIGN PATENT DOCUMENTS

| | | |
|---|---|---|
| GR | 20100100129 A | 10/2011 |
| WO | 9951430 A1 | 10/1999 |
| WO | 1999061504 | 12/1999 |
| WO | 2012019258 A1 | 2/2012 |
| WO | 2012113737 A1 | 8/2012 |
| WO | 2013053555 A2 | 4/2013 |
| WO | 2016168043 A1 | 10/2016 |

OTHER PUBLICATIONS

Post, Nadine M. "Fire Tests Inspire More Robust Timber Product Standard." Engineering NewsRecord RSS, Engineering News-Record, Mar. 7, 2018, <http://www.enr.com/articles/44129-fire-tests-inspire-more-robust-timber-product-standard> Accessed Aug. 15, 2022.

Ecomate an Environmentally Friendly Blowing Agent for Polyurethane Foams. Ecomate, <http://www.protocolodemontreal.org.br/eficiente/repositorio/Ciclo de Palestras/813.pdf> Accessed Aug. 15, 2022.

Sheppard, M. (Feb. 1, 2018). Federal Update: Regulation of Foam Blowing Agents. Retrieved from <http://www.sprayfoam.org/files/docs/2018/Sessions/Session_4F_SheppardM_202A.pdf> Accessed Aug. 15, 2022.

Tebbe, Heiko, and Joseph Egan. "New Flame Retardant Solutions For Flexible PU Foams In Automotive Applications." Coatings World, Dec. 4, 2017, <http://www.coatingsworld.com/issues/2017-12-01/view_features/new-flame-retardant-solutions-for-flexible-pu-foams-in-automotive-applications/> Accessed Aug. 15, 2022.

Dacomba, Raul. "Next-Generation Appliance Foams: The Challenges Ahead." Next-Generation Appliance Foams: The Challenges Ahead, Oct. 1, 2017, <http://digital.bnpmedia.com/publication/?i=441273&article_id=2893009&view=articleBrowser&ver=html5> Accessed Aug. 15, 2022.

Martin, Jerry. "Honeywell Products Made in Louisiana Are Having a Dynamic Impact on a Series of Industries." Baton Rouge Business Report, Apr. 22, 2017, <http://www.businessreport.com/industry/honeywell-products-made-louisiana-dynamic-impact-series-industries> Accessed Aug. 15, 2022.

"Transitioning to Low-GWP Alternatives in Building and Construction Foams." EPA, Environmental Protection Agency, Dec. 12, 2016, <http://www.epa.gov/ozone-layer-protection/transitioning-low-gwp-alternatives-building-and-construction-foams> Accessed Aug. 15, 2022.

"XPSA Supports Montreal Protocol Amendment Accelerating HFC Phase-Out." Roofing, Nov. 2, 2016, <http://www.roofingmagazine.com/xpsa-supports-montreal-protocol-amendment-accelerating-hfc-phase-out/> Accessed Aug. 15, 2022.

Plumer, Brad. "197 Countries Just Agreed to Phase out HFCs—a Potent Greenhouse Gas in Air Conditioners." Vox, Vox, Oct. 15, 2016, <http://www.vox.com/2016/10/15/13292878/montreal-protocol-cut-hfcs> Accessed Aug. 15, 2022.

Ghaderian, A., Haghighi, A. H., Taromi, F. A., Abdeen, Z., Boroomand, A., Taheri, S. M.-R. "Characterization of Rigid Polyurethane Foam Prepared from Recycling of PET Waste", Periodica Polytechnica Chemical Engineering, 59(4), pp. 296-305, 2015.

Sonnenschein, Mark F. Polyurethanes: Science, Technology, Markets, and Trends, Chapter 2. Wiley-Blackwell, 2021.

Luo, X., Li, Y. Synthesis and Characterization of Polyols and Polyurethane Foams from PET Waste and Crude Glycerol. J Polym Environ 22, 318-328 (2014).

Loh, G., Creazzo, J.A., & Robin, M.L. (2012). Performance Update on Formacel® 1100 (FEA-1100)—a Zero ODP and Low GWP Foam Expansion Agent.

Vitkauskiene, I., et al. "Synthesis and Physical-Mechanical Properties of Polyurethane-Polyisocyanurate Foams Based on PET-Waste-Derived Modified Polyols-I. Vitkauskiene, R. Makuska, U. Stirna, U. Cabulis, 2011." SAGE Journals, Jan. 1, 1970, Abstract Only.

(56) References Cited

OTHER PUBLICATIONS

Vo, Chau V., et al. "Advances in Thermal Insulation of Extruded Polystyrene Foams—Chau V. Vo, Friedhelm Bunge, John Duffy, Lawrence Hood, 2011." Cellular Polymers 2011, 30:137-156.

Vitkauskienė, Irena, and Ugis Cabulis. "Thermal Properties of Polyurethane-Polyisocyanurate Foams Based on Poly(Ethylene Terephthalate) Waste." Materials Science, Mar. 19, 2011, <http://www.matsc.ktu.It/index.php/MatSc/article/view/588> Accessed Aug. 15, 2022.

"DuPont™ Formacel® Blowing Agents." Mafiadoc.com, mafiadoc.com, <<http://mafiadoc.com/dupont-formacel-blowing-agents_59cf180a1723dd8df1150b6e.html> Accessed Aug. 15, 2022.

Dedecker, Kristof. "Blowing Agent Options for Insulation Foam after HCFC Phase Out." <http://www.huntsman.com/polyurethanes/Media Library/a_MC1CD1F5AB7BB1738E040EBCD2B6B01F1/Products_MC1CD1F5AB8081738E040EBCD2B6B01F1/Insulation_ME4E93A022E848990E040EBCD2C6B1951/files/Blowing agent options for insulation foam after HCFC phase out.pdf> Accessed Aug. 15, 2022.

Snider, D., & Fava, D. (2011). Assessment of HBA-2 Blowing Agent as Replacement of HFCs in Rigid Polyurethane Insulating Foams for the Cold Chain Industry.

Walter-Terrinoni, H. (Nov. 12, 2010). DuPont™ FEA-1100: Zero ODP, Low GWP, Non-Flammable Alternative for-HCFC-141b. Retrieved from <https://www.slideserve.com/elan/dupont-fea-1100-zero-odp-low-gwp-non-flammable-alternative-for-hcfc-141b> Accessed Aug. 15, 2022.

Boyadzhiev, Marin, et al. "Development of Branched Aromatic Polyester Polyols from PET." OPUS 4 | Development of Branched Aromatic Polyester Polyols from PET, 2007, <http://opus4.kobv.de/opus4-th-wildau/frontdoor/index/index/docId/33> Accessed Aug. 15, 2022.

Opteon™ 1100 Foam Blowing Agent—A Foam Blowing Agent to Reduce Energy Consumption. Opteon, 2020, <http://www.opteon.com/en/products/foam-blowing/1100?_ga=2.24613562.1874545410.1591120797-231095807.1591120797> Accessed Aug. 15, 2022.

Azim, Abdel Azim A. Abdel, et al. "Synthesis of Rigid Polyurethane Foams from Recycled Poly(Ethylene Terephthalate) Waste—Abdel Azim A. Abdel Azim, Ayman M. Atta, R.A. El-Ghazawy, 2006." Cellular Polymers, 2006, 25:35-48.

Evtimova, Roseta & Lozeva, Yordanka & Schmidt, Kari-Heinz & Wotzka, Michael & Wagner, Peter & Behrendt, Gerhard. (2003). Polyester Polyols from Waste PET Bottles for Polyurethane Rigid Foams.

Billiau-Loreau, Myriam, et al. "Structural Effects of Diacidic and Glycolic Moieties on Physicochemical Properties of Aromatic Polyesterdiols from Glycolysis/Esterification of Poly(Ethylene Terephthalate) Wastes." Polymer, 2002, 43:21-28.

"Stepan Polyester Polyols for Rigid Polyisocyanurate (PIR) and Polyurethane (PUR Foam)." <https://www.stepan.com/uploadedFiles/Literature_and_Downloads/General_Lit/Polyester_Polyols/StepanRigidFoamBrochure.pdf> Accessed Aug. 15, 2022.

* cited by examiner

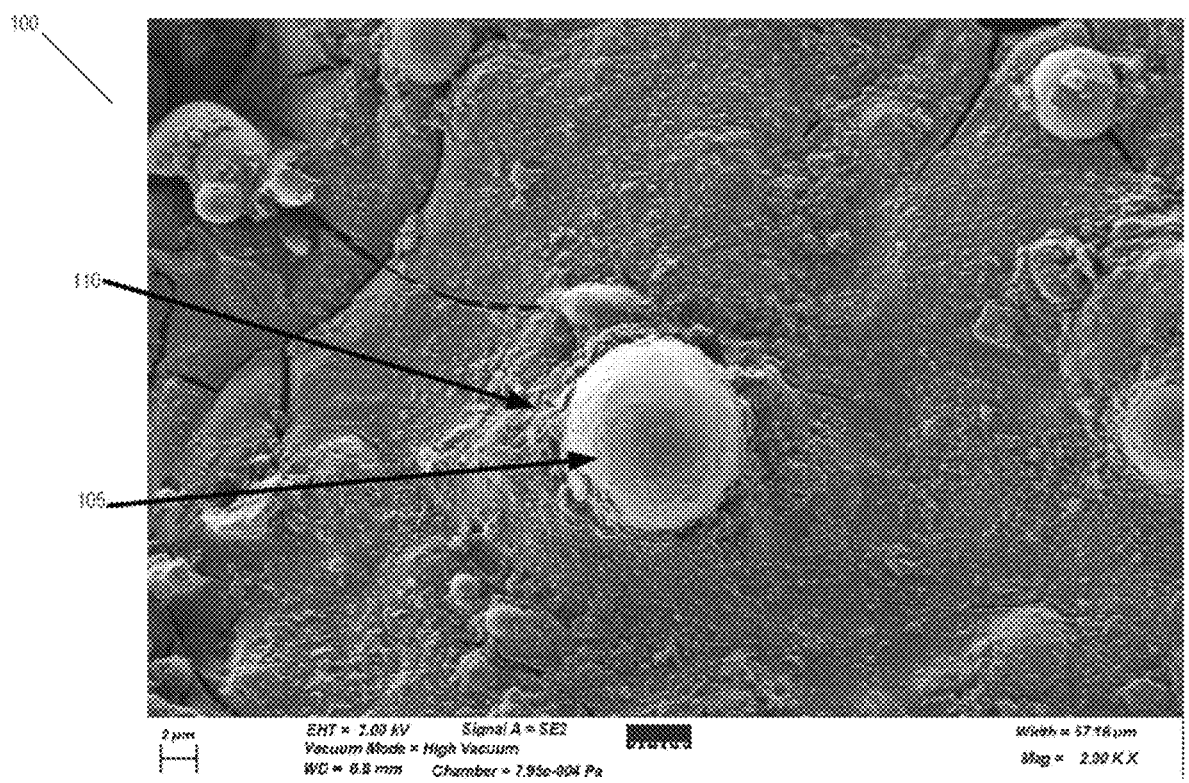

METHODS OF MAKING FOAMS EXHIBITING DESIRED PROPERTIES FROM AROMATIC POLYESTER POLYETHER POLYOLS DERIVED FROM POLYETHYLENE TEREPHTHALATES AND FOAMS MADE THEREFROM

CROSS-REFERENCE TO RELATED APPLICATIONS

This Application claims the benefit of U.S. Provisional Application No. 62/794,794, filed on Jan. 21, 2019, which is incorporated herein by reference in its entirety.

FIELD OF THE DISCLOSURE

The disclosure relates to methods of making foams comprising aromatic polyester polyether polyol materials derived from the transesterification of polyethylene terephthalate with either glycerin or trimethylolpropane, wherein each of these triols, independently, has a degree of ethoxylation of from 1 to 9. Uses of the foams are further disclosed. The disclosure further relates to selection of blowing agents suitable to generate a selected end use case. Yet further, the disclosure relates to selection of end uses, properties, and environmental profiles of the foams generated according to the methods herein, and selecting formulation variables suitable to obtain the foams.

BACKGROUND OF THE DISCLOSURE

It is mandated by the Montreal Protocol that blowing agents have no Ozone Depletion Potential ("ODP"). However, some blowing agents in use today are recognized as emitting volatile organic compounds ("VOCs"), which is a leading contributor to smog and, more significantly, Global Warming. The US Environmental Protection Agency sought to curtail the use of these materials and to promote the use of more environmentally benign materials by adoption of certain regulations known as Significant New Alternatives Policy ("SNAP"). While those regulations are not currently being enforced in relation to materials having Global Warming Potential ("GWP") such as VOCs, they are still in effect in relation to ODP. The US and almost every country in the world have adopted the Montreal Protocol, and the US remains in this treaty, including the recent Kiligali Amendment that specifically addresses the decreased use of VOC-containing chemicals throughout the world. Such global recognition that VOCs are a contributing cause to Global Warming means that there is no doubt that manufacturers are motivated to seek alternatives to problematic blowing agents in the future. At the very least, hydrofluorocarbons ("HFCs") with high-VOC emission levels will need to be replaced by HFCs with lower GWP ratings.

One blowing agent alternative to HFCs is hydrofluoroolefin ("HFO"), which is a blowing agent with no GWP. This blowing agent is currently being introduced into the market by various manufacturers that have specific proprietary versions. However, these HFO products do not provide a "drop in" solution. When formulated with existing polyols as the "B side" component to be mixed with the "A side" isocyanate to form a polyurethane foam, these HFO blowing agents have been shown to exhibit solubility and stability issues. The foams prepared using these materials also are often not comparable to prior art polyurethane foams, if only because these new blowing agents are being used with existing polyol materials that were created for use with the prior generation blowing agents. In this regard, polyurethane foams are known to be highly formulation dependent, with even minor changes to the raw materials often resulting in major changes to the behavior of raw material compositions, application parameters, and the performance of the generated foam. Thus, it is possible that many of the previously satisfactory polyol materials will be found to be incompatible with these new blowing agents, some of which provided properties and performance needed for a particular use case.

Other available blowing agents are environmentally friendly, such as methyl formate, hydrocarbons, water, and $CO_2$. While these materials have been around for some time, they have experienced limited use as blowing agents for polyurethane foams, at least because foams generated from these materials often do not meet the expected performance requirements for certain widely used end products. While these foam products could find utility for in use cases where lower performance is acceptable, such as packaging, the costs of the polyurethane containing materials, in particular the polyols, is too high for such lower value applications. Moreover, these blowing agents need to be specifically optimized for each class/type of polyol materials.

There remains a need for polyols that can be used to generate foams that can provide the necessary performance criteria for a particular use case. Yet further, there is a need for polyols that can be used to generate well-performing polyurethane foams using environmentally appropriate blowing agents. Still further, there is a need for polyol materials that are generated from recycled and/or sustainable materials to provide further improvements in the environmental profiles of these products. The present disclosure provides these and other benefits.

SUMMARY OF THE DISCLOSURE

The disclosure relates to methods of making foams comprising aromatic polyester polyether polyol materials derived from the transesterification of polyethylene terephthalate with either glycerin or trimethylolpropane, wherein each of these triols, independently, has a degree of ethoxylation of from 1 to 9. A variety of environmentally appropriate blowing agents can suitably be used to generate the foam materials including a subset of HFCs, HFOs, hydrocarbons, methyl formate, water, $CO_2$, among others. The disclosure also relates to polyurethane foams generated from these polyols. The foams can be low density foams suitable for insulation, coatings, cushioning or the like. Higher density foams can also be generated for suitable use cases. The foams can be used to coat substrates, as adhesives, or as stand-alone materials. The disclosure further relates to selection of a blowing agents suitable to generate a selected use case. Yet further, the disclosure relates to selection of end uses, properties, and environmental profile of the foams generated according to the methods herein, and selecting formulation variables suitable to obtain those Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

BRIEF DESCRIPTION OF DRAWINGS

FIG. 1 is a photomicrograph showing a cross-section of a foamed inventive polyurethane composition.

DETAILED DESCRIPTION

Before the present disclosure is described in greater detail, it is to be understood that this disclosure is not limited to particular aspects described, and as such may, of course, vary. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

All publications and patents cited in this specification are herein incorporated by reference as if each individual publications or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publications by virtue of prior disclosure. Further, the dates of publications provided could be different from the actual publications dates that may need to be independently confirmed.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Although any methods and materials similar or equivalent to those described herein can also be used in the practice or testing of the present disclosure, the various methods and materials suitable for use with the various disclosures disclosed herein are now described. Functions or constructions well-known in the art may not be described in detail for brevity and/or clarity.

Prior to describing the various aspects of the present disclosure, the following definitions are provided and should be used unless otherwise indicated. Additional terms may be defined elsewhere in the present disclosure.

Definitions not specifically set out herein are as set out in US Utility patent application Ser. No. 16/164,049 and US Provisional Patent Application No. 62/722,874, the disclosures of which are incorporated in their entireties by this reference.

Aromatic Polyester Polyether Polyols

In a first aspect, the disclosure comprises an aromatic polyester polyether polyol generated, in one aspect, from transesterification of polyethylene terephthalate ("PET") in a transesterification reaction conducted in the presence of a low molecular weight triol material, wherein the low molecular weight triol comprises either glycerin or trimethylolpropane, and wherein each of the glycerin or trimethylolpropane, independently, has been modified with from 1 to 9 moles of ethylene oxide according to known methodology. Yet further, each of the glycerin or trimethylolpropane, independently, has been modified with 1 or about 2 or about 3 or about 4 or about 5 or about 6 or about 7 or about 8 moles or 9 moles of ethylene oxide, wherein any value can form an upper or lower ethylene oxide modification endpoint, as appropriate. Still further, the foamed aromatic polyester polyether polyol is derived from transesterification of PET with trimethylolpropane or glycerin consisting essentially of 1 to 9 moles of ethoxylation, or, in more specific implementations, 1 or 2 or 3 or about 4 or 5 or 6 or 7 or 8 or 9 moles of ethoxylation.

A significant aspect of the present disclosure comprises the ability to use at least some amount of PET that is derived from a recycled source to generate a polyurethane foam for a selected use case. In this regard, the PET used is generally in the form of flakes or pellets, to generate an aromatic polyester polyether polyol that provides at least some of the hydroxyl functionality for reaction with the isocyanate. As would be appreciated, there is an abundance of PET in waste streams throughout the globe. The present disclosure provides a heretofore unavailable use for a not insignificant amount of such waste material as a chemical feedstock to generate valuable materials, such as polyurethanes. Such recycled material can be derived from pre-consumer or post-consumer use.

A common source for recycled PET is pre- or post-consumer waste streams derived from plastic bottles or other containers. Such PET can be colorless or contain dyes (e.g., green, blue, or other colors) or can be mixtures of these. A minor proportion of organic or inorganic foreign matter (e.g., paper, other plastics, glass, metal) can be present, which can be separated out prior to the transesterification reaction. At a minimum, however, recycled PET will include at least some artifacts of the prior use. For example, for PET oligomers derived from post-consumer waste will exhibit at least some of the characteristics imparted by the processing of the PET into the product in which it was previously used, such as blow molding for bottles, stretching for fibers, etc. Thus, PET oligomers generated in the transesterification reaction will include at least some artifacts of a previous mechanical treatment, such as reduced I.V, as discussed hereinafter. Moreover, it typically would not be cost effective to remove all additives from the PET prior to use thereof, especially since colorants, UV scavengers, etc., that are typically included in a first use process for PET may position themselves between polymeric chains during the first processing step and, thus, will differ at least in this regard from an aromatic polyester polyether polyol generated from virgin raw chemical feedstock.

Moreover, for some use cases, artifacts of a prior use of PET may not materially affect the performance of a generated polyurethane foam. For example, polyurethane foams intended for use as a packing material may need only to exhibit certain cushioning properties so as to allow an item(s) to be shipped or transported substantially without damage. The PET used to generate aromatic polyester polyether polyols for use as a packing material may then be suitable for use without or with minimal pre-cleaning. Thus, a "dirtier" PET source may be suitable. For the PET used to the generate the aromatic polyester polyether polyols used in a construction application, artifacts of the prior use of the PET may decrease the performance of a polyurethane foams generated therefrom. Accordingly, a PET sourced for use in generating a polyurethane foams for a construction application may be sourced from a "cleaner" stream of PET, such as pre-consumer PET waste, or a stream that is the downstream product of a PET recycling process that includes one or more steps where the artifacts of the prior PET use are removed. The present disclosure, in some implementations, selection of a source of recycled PET for a particular use case for a polyurethane foam prepared therefrom.

In some implementations, the desirable type of recycled PET is "flake" PET, from which many, but not all, of the common impurities present in scrap PET bottles have been removed in advance. Another desirable source of recycled PET is pelletized PET. PET pellets can also be used, or any other suitable configuration from which the desired polyurethane foams performance can be generated therefrom.

As would be appreciated, the aromatic polyester polyether polyol may comprise fillers, colorants, etc. that were not removed previously from the recycled PET source. Accordingly, in some aspects, the aromatic polyester polyether polyol can be treated with a decolorizing agent and/or be subjected to a filtering step prior to use to generate the polyurethane foams. Such methodologies are well-known to those of skill in the art. Alternatively, the native color of the aromatic polyester polyether polyol can be left in therein, which will result in the finished polyurethane having a "muddy" color, for example. Such color is typically irrelevant when the polyurethane is used on an interior surface. However, when the polyurethane is used on an exterior/visible surface, the polyurethane is tintable or it can be painted, as further discussed herein.

In the present disclosure, at least about 5, 10, 20, 30, 40, 50, 60 or 70% or more of recycled PET can be used to generate the aromatic polyester polyether polyols, wherein none, some, or substantially all of the artifacts of prior use can be removed. The aromatic polyester polyether polyols can comprise a majority of recycled PET, or even substantially all can be comprised of recycled PET. Yet further, at least some virgin PET can be used. A mixture of virgin and recycled PET can be used.

In a significant implementation of the present disclosure, the ethoxylated glycerin used in the aromatic polyester polyether polyol generation (as is detailed in the '049 Application, previously incorporated by reference) can be at least partially derived from a sustainable, or non-petroleum source, such as vegetable or animal sources. Use of glycerin with recycled PET can allow a polyurethane foams having substantial recycled/sustainable content to be provided.

Yet further, upcycled glycerol from biodiesel manufacture can be used to further improve the environmental profile of the polyurethanes herein. As would be recognized, glycerol is a major byproduct in the biodiesel manufacturing process. In general, for every 100 pounds of biodiesel produced, approximately 10 pounds of crude glycerol are created. As the biodiesel industry is rapidly expanding, a glut of crude glycerol is being created, and use of such waste to make the foamed aromatic polyester polyether polyols can be beneficial.

The amount of PET, in particular, recycled PET, used in the transesterification reaction from which the aromatic polyester polyether polyols is generated can be, on a weight percentage of the total amount of material in the reaction, can be from about 5% to about 50%, from about 10 to about 35%, or from about 15 to about 30%. Still further, the amount of PET used in the transesterification reaction is about 5, 10, 15, 20, 25, 30, 35, 40, 45, 50, 55, 60 or 65% by weight, where any value can form an upper or lower endpoint, as appropriate. Yet further, the amount of PET used in the transesterification reaction is no more than 65% by weight. Accordingly, the amount of ethoxylated triol present in the transesterification reaction can be in the amount needed to add up to 100% by weight. (Note that the catalyst, if any, may not be incorporated in the weight percent calculations.) Still further, the ratio of PET to ethoxylated triol having from 1 to 9 moles of ethoxylation can be about 10:90, 20:80, 30:70; 40:60, 50:50, or 60:40. As noted, at least some of the PET used can be from a recycled source.

As detailed in the '049 Application, previously incorporated by reference, the aromatic polyester polyether polyols used to generate the polyurethane foams can be characterized in a number of manners.

In a first characterization, the aromatic polyester polyether polyols comprise branched polyols suitable for reaction with isocyanate, wherein the polyols are prepared via transesterification of a glycerin or trimethylolpropane having 1 to 9 moles of ethoxylation with PET with the first reaction product resulting in terephthalate moieties reacted to a flexible branching center. In a further characterization, the disclosure comprises aromatic polyester polyether polyols that are the reaction product of an ethylene oxide modified glycerin or trimethylolpropane having a degree of ethoxylation of 1 to 9 moles with polyethylene terephthalate through transesterification. In this regard, the product of the transesterification process would appear to be a mixture of different molecular weight PET-related materials therein. The aromatic polyester polyether polyols derived from the transesterification reaction detailed in the '049 Application can further be characterized as an oligomeric mixture of branched, hydroxyl terminated moieties prepared by the transesterification of PET with an ethylene oxide modified glycerin and trimethylolpropane having 1 to 9 moles of ethoxylation, having one or more viscosity characteristics as described hereinabove. Yet further, the aromatic polyester polyether polyols used to prepare the polyurethane foams can be characterized as a mixture of terephthalate esters prepared by the transesterification of PET with an ethylene oxide modified glycerin or trimethylolpropane having 1 to 9 moles of ethoxylation, having one or more viscosity characteristics as described hereinabove.

In various aspects, the aromatic polyester polyether polyol used to prepare the polyurethane foamss set out herein has a structure based on a glycerol backbone, the structure represented by a formula:

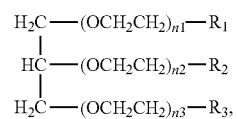

wherein each of $R_1$, $R_2$, and $R_3$ is independently selected from hydroxyl and a structure represented by a formula:

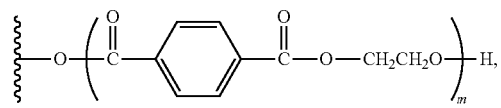

wherein m has a value such that the aromatic polyester polyether polyol has a first Brookfield Cone and Plate Viscosity of about 2.7 to about 3.2 Poise (Spindle #4, 60° C., 100 rpm); wherein the first Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In various aspects, the disclosed aromatic polyester polyether polyols used to prepare the polyurethane foams herein have a structure based on a glycerol backbone, the structure represented by a formula:

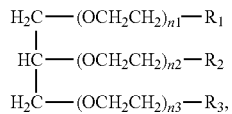

wherein each of $R_1$, $R_2$, and $R_3$ is independently selected from hydroxyl and a structure represented by a formula:

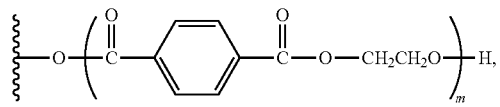

wherein m has a value such that the aromatic polyester polyether polyol has a second Brookfield Cone and Plate Viscosity of about 3.2 to about 3.8 Poise (Spindle #4, 60° C., 100 rpm); wherein the second Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In a further aspect, the aromatic polyester polyether polyols used to prepare the foamed polyurethanes can have a structure based on a glycerol backbone, the structure represented by a formula:

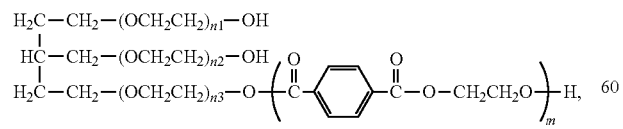

wherein m, $n_1$, $n_2$, and $n_3$ having the meaning as specified herein.

In a further aspect, a disclosed aromatic polyester polyether polyols used to prepare the foamed polyurethanes can have a structure based on a glycerol backbone, the structure represented by a formula:

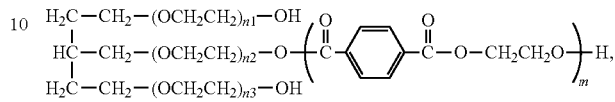

wherein m, $n_1$, $n_2$, and $n_3$ having the meaning as specified herein.

In a further aspect, a disclosed aromatic polyester polyether polyols used to prepare the polyurethane foams can have a structure based on a glycerol backbone, the structure represented by a formula:

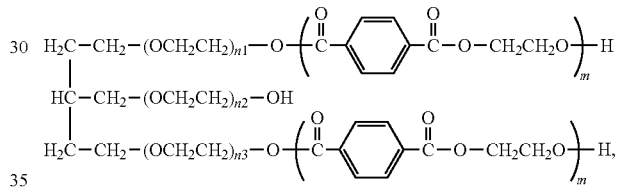

wherein m, $n_1$, $n_2$, and $n_3$ having the meaning as specified herein; and wherein the value of each occurrence of m can vary independently from another occurrence of m.

In a further aspect, a disclosed aromatic polyester polyether polyols can have a structure based on a glycerol backbone, the structure represented by a formula:

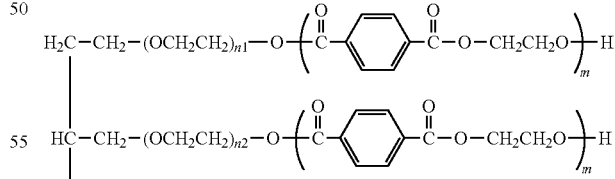

wherein m, $n_1$, $n_2$, and $n_3$ having the meaning as specified herein; and wherein the value of each occurrence of m can vary independently from another occurrence of m.

In various aspects, the aromatic polyester polyether polyols for preparing the polyurethane foams have a structure based on a trimethylolpropane (or alternatively referred to herein as "TMP") backbone, the structure represented by a formula:

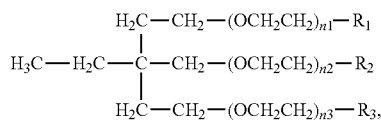

wherein each of $R_1$, $R_2$, and $R_3$ is independently selected from hydroxyl and a structure represented by a formula:

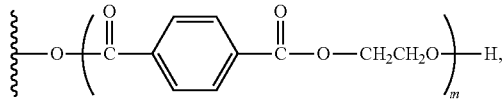

wherein m has a value such that the aromatic polyester polyether polyol has a first Brookfield Cone and Plate Viscosity of about 3.7 to about 4.2 Poise (Spindle #4, 60° C., 100 rpm); wherein the first Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_1$, and $n_3$ is 1 to 9.

In various aspects, the disclosed aromatic polyester polyether polyols used to prepare the polyurethane foams have a structure based on a TMP backbone, the structure represented by a formula:

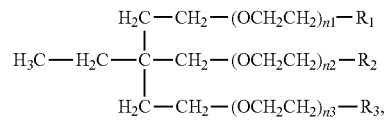

wherein each of $R_1$, $R_2$, and $R_3$ is independently selected from hydroxyl and a structure represented by a formula:

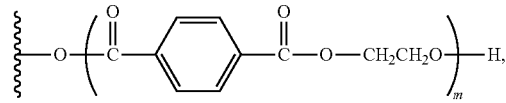

wherein m has a value such that the aromatic polyester polyether polyol has a second Brookfield Cone and Plate Viscosity of about 4.0 to about 5.0 Poise (Spindle #4, 60° C., 100 rpm); wherein the second Brookfield Cone and Plate Viscosity is as defined herein above; and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9.

In a further aspect, a disclosed aromatic polyester polyether polyols used for the polyurethane foams can have a structure based on a TMP backbone, the structure represented by a formula:

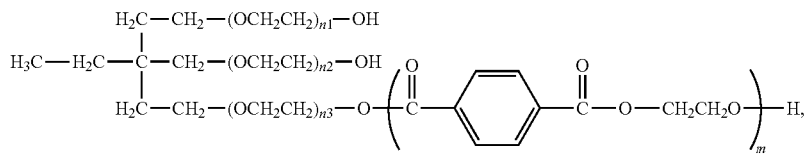

wherein m, $n_1$, $n_2$, and $n_3$ having the meaning as specified herein.

In a further aspect, a disclosed aromatic polyester polyether polyols for the polyurethane foams can have a structure based on a TMP backbone, the structure represented by a formula:

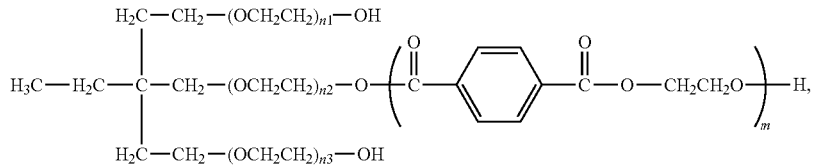

wherein m, $n_1$, $n_2$, and $n_3$ having the meaning as specified herein.

In a further aspect, a disclosed aromatic polyester polyether polyols used to generate the polyurethane foams can have a structure based on a TMP backbone, the structure represented by a formula:

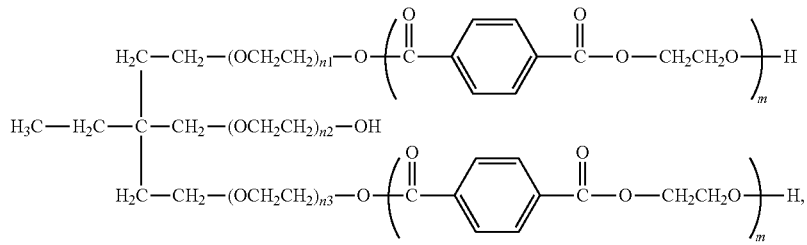

wherein m, $n_1$, $n_2$, and $n_3$ having the meaning as specified herein; and wherein the value of each occurrence of m can vary independently from another occurrence of m.

In a further aspect, a disclosed aromatic polyester polyether polyols used to generate the polyurethane foams can have a structure based on a TMP backbone, the structure represented by a formula:

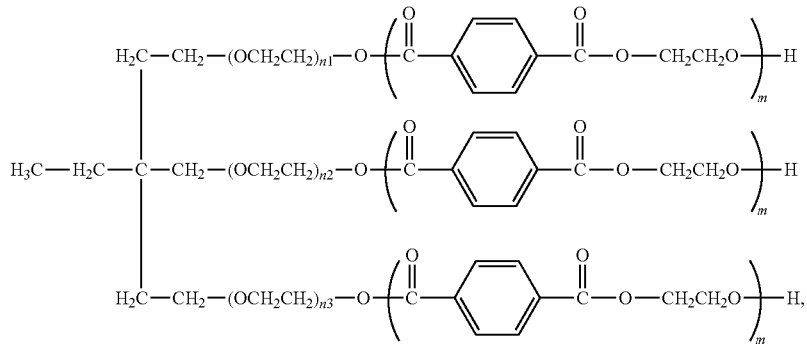

wherein m, $n_1$, $n_2$, and $n_3$ having the meaning as specified herein; and wherein the value of each occurrence of m can vary independently from another occurrence of m.

The aromatic polyester polyether polyols used herein can be differentiated because they are flowable liquids at temperatures below about 40° C., or about 50° C., or about 60° C., or about 70° C., or about 80° C. In other implementations, the aromatic polyester polyether polyols are advantageously flowable liquids under ambient or slightly elevated conditions, which is a distinct advantage for formulating polyurethane foams. Such distinct viscosity characteristics are believed to markedly affect the formulation parameters used to generate polyurethane foams as discussed hereinbelow. The aromatic polyester polyether polyol can be from about 3.0 to about 6.0, or from about 4.0 to about 5.5, or from about 4.5 to about 5.0 Poise, as measured by a Cone and Plate Brookfield viscometer at 100 rpm using at 60° C. using spindle #4, or at about 70° C. if the aromatic polyester polyether polyol is too viscous at 60° C., such as was seen with 50% PET/50% glycerin having 2 moles of ethoxylation, for example. Yet further, the viscosity of the aromatic polyester polyether polyol used to generate the polyurethane foams can be about 2.0, 2.5, 3.0, 3.5, 4.0, 4.5, 5.0, 5.5, 6.0, 6.5, 7.0, 7.5 or 8.0 Poise, as measured by the stated Brookfield parameters, where any value can be used as an upper or lower endpoint as appropriate.

As would be appreciated, the aromatic polyester polyether polyols described herein includes polyether functionality as well as aromatic polyester. To the extent that polyols and polyethers are often mixed at various ratios to generate a polyurethane foams, the present disclosure can provide dual functionality that is typically gained by use of separate ingredients. For example, and as discussed in US Patent Publication No. 20140213677, the disclosure of which is incorporated herein in its entirety, aromatic polyester polyols generally can exhibit low functionality, that is, a functionality close to 2. This low functionality generally has a negative impact on green compressive and compressive strength in the finished polyurethane foams. High functionality polyols such as glycerin or pentaerythritol may be used to increase the functionality of the polyester polyol. However, this increased functionality typically comes at the expense of a significant increase in viscosity in the polyols, thus making them less workable. Use of a hybrid polyester-polyether polyol such as disclosed herein (also known as a "polyetherester") can be expected to provide a combination of the properties of each of a polyurethane generated from an aromatic polyester polyol and a polyether polyol. As such, formulation improvements are expected to result from use of the aromatic polyester polyether polyols disclosed herein.

Isocyanates

The isocyanate with which the foamed aromatic polyester polyether polyol is reacted to generate the foamed polyurethane can comprise one or more of a variety of diisocyanates. An exemplary diisocyanate monomer can include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like, or any combination thereof. Such diisocyanate monomers can be used alone or in admixture of at least two kinds. In a particular example, the isocyanate component can include methylene diphenyl diisocyanate (MDI), toluene diisocyanate (TDI), hexamethylene diisocyanate (HDI), isophorone diisocyanate (IPDI), or any combination thereof. In an example, the isocyanate can include methylene diphenyl diisocyanate (MDI) or toluene diisocyanate (TDI). In particular, the isocyanate includes methylene diphenyl diisocyanate (MDI) or derivatives thereof.

The diisocyanate can have an average functionality in a range of about 2.0 to 2.9, such as a functionality of from about 2.0 to about 2.7. Further, the diisocyanate can have an NCO content in the range of from about 15% to about 35%, such from about 20% to about 30%.

In one aspect, the isocyanate component can be methylene diphenyl diisocyanate (MDI). Yet further, the isocyanate component consists essentially of MDI. In a further example, a diisocyanate can include a mixture of diisocyanates, such as a mixture of modified methylene diphenyl diisocyanates. A suitable MDI for use in the disclosure herein is PAPI™ 27 (Dow Chemical, Midland, Mich.), a polymeric MDI (methylene biphenyl diisocyanate) with 31.4% NCO.

Polyurethane Foam Compositions Generally

As would be recognized, polyurethanes are made by the exothermic reactions between materials with two or more reactive hydroxyl (—OH) groups per molecule (diols, triols, polyols), such as the disclosed aromatic polyester polyether polyols, and isocyanates that have more than one reactive isocyanate group (—NCO) per molecule (diisocyanates, polyisocyanates). For example, a diisocyanate reacts with a diol:

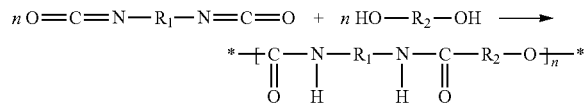

To generate a polyurethane foam, it is necessary to mix the right amounts of the two major components (polyisocyanate and polyol, which are liquids under reactions conditions) and a suitable blowing agent.

When producing a foamed polyurethane, there are multiple ways to generate a gas inside the reacting liquid mixture. The so called "chemical blowing agent" uses water that may have been added to the polyol that reacts with some of the polyisocyanate to create carbon dioxide:

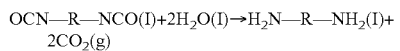

Alternatively, in use of a "physical blowing agent," a liquid with a low boiling point, for example pentane, is mixed into the aromatic polyester polyether polyols. The urethane reaction is exothermic and so, as it proceeds, the mixture warms up and the pentane vaporizes. A small amount of air is dispersed through the mixture of polyisocyanate and polyol. This provides nucleation seeds for the multitude of gas bubbles that are produced throughout the polymer. Heat makes the bubbles expand until the polyurethane chemical reaction changes the liquid to solid polymer, and the available gas pressure cannot create any further expansion. Microspheres that incorporate gas can also be used. Such blowing agents are discussed further hereinafter. The blowing agent aspect of the present disclosure is discussed hereinbelow.

Blowing Agents

Blowing agents are used to generate the foamed compositions of the present disclosure as would be appreciated. In certain aspects, the aromatic polyester polyether polyol is combined with one or more blowing agents, either in a pre-formulated mixture that is storage stable or immediately prior to mixing with the isocyanate at the time of foam generation. Blowing agents can include, but not be limited to, physical blowing agents, chemical blowing agents, or combinations thereof. In some aspects, the term "chemical blowing agents" means compounds that form gaseous products via reaction with isocyanate, an example being water or formic acid. The term "physical blowing agents" means compounds which have been dispersed, dissolved, or otherwise distributed in either or both of the aromatic polyester polyether polyol or isocyanate starting material and which generate gas under the conditions of the polyurethane formation herein. In other aspects, the foamed aromatic polyester polyether polyols may also comprise one or more blowing agents. Yet further, the blowing agent may include either or both of a physical blowing agent or a chemical blowing agent. The blowing agent is selected to substantially not chemically react with the foamed aromatic polyester polyether polyol and/or the isocyanate component independently until the foam production is desired.

A significant aspect of the disclosure herein is selection of a blowing agent, or mixtures of blowing agents, that can generate a polyurethane foam having suitable properties for a selected use case. Moreover, such selected blowing agent (s), should also comport with appropriate environmental characteristics as dictated by national, global, or societal considerations, such as regulatory schemes or consumer desire for low-impact products.

With regard to the properties of a blowing agent for a selected use case, at least the following may be relevant, solubility of the blowing agent in the aromatic polyester polyether polyols, stability of the blowing agent/aromatic polyester polyether polyols mixture (which can relate to solubility), functional characteristics of the blowing agent, environmental characteristics of the blowing agent, behavior of the blowing agent when used with the aromatic polyester polyether polyols and isocyanate to generate the cost of the blowing agent for a particular use, the intended use of the polyurethane foam material (e.g., spray foam insulation, panelized insulation, molded product, adhesive coating with or without insulation properties, packaging, etc.), and the desired properties of the polyurethane foam material (e.g., compression strength, tensile strength, R value, flammability profile, combustibility, recycled/sustainable content, closed cell, open cell, cell size, etc).

For example, at least three parameters can influence the insulation performance of rigid polyurethane foam that is closed cell: cell size, the thermal conductivity of the gas entrained within the cells, and foam density. The selected blowing agent will thus affect the properties of closed cell foams. The manner in which the blowing agent interacts with the aromatic polyester polyether polyols itself, and how it behaves during a specific polyurethane reaction are of relevance in generating the foam itself. Moreover, the blowing agents' inherent insulating characteristics (i.e., thermal conductivity) will be relevant to the overall insulating performance of polyurethane foam. The shape and size of the cells produced during a reaction will have an impact on the properties of the foam produced. In accordance with the disclosure herein, a blowing agent for the application is selected, optionally with a surfactant. Moreover, the integrity of the cells formed can also affect the properties of the foam at least because an entrained gaseous blowing agent can leak out of cells over time and the thermal properties of the foam can decrease over time. This can occur with water blown foams, for example. In contrast, selection of a suitable blowing agent, often with a surfactant, can allow uniform cells to be generated throughout the foam and this can give consistent physical properties, across, along and through the foam structure. Accordingly, blowing agent selection and use thereof is are an integral aspect of generating a polyurethane foams having the desired end properties, for example, that the foam has the appropriate size, type and distribution of cells for a selected use case.

As noted, the environmental impact of a blowing agent may be relevant to the selection thereof. In some implementations, the blowing agents herein have a Global Warming Potential ("GWP") of not greater than about 1000, or not greater than about 500, and or not greater than about 150. In certain embodiments, the GWP of the present compositions is not greater than about 100 and not greater than about 75. As used herein, "GWP" is measured relative to that of carbon dioxide and over a 100 year time horizon, as defined in "The Scientific Assessment of Ozone Depletion, 2002, a report of the World Meteorological Association's Global Ozone Research and Monitoring Project," which is incorporated herein by reference. In yet further implementations, the selected blowing agents can have an Ozone Depletion Potential ("ODP") of not greater than 0.05, or not greater than 0.02, or about zero. As used herein, "ODP" is as defined in "The Scientific Assessment of Ozone Depletion, 2002, A report of the World Meteorological Association's Global Ozone Research and Monitoring Project," which is incorporated herein by reference.

In some aspects, the selected blowing agent is a gaseous blowing agent, such as an inert hydrocarbon gases (e.g., isobutane, pentane, etc.) or an inert gas (e.g., $CO_2$, $N_2$, etc.), or a liquid hydrofluoroolefin ("HFO"), or methyl formate. Yet further, the selected blowing agent can be a liquid blowing agent, such as water, HFCs (hydrofluorocarbons), and HCFC-123, and some formulations of HFO, such as HFO-1233zd(E).

As would be appreciated, some high performing materials can nonetheless exhibit the propensity to contribute to ground level ozone formation due to the presence of VOC's in therein. Accordingly, in some aspects, the selection of blowing agent will also take into consideration the level of VOC's generated by the blowing agent in use, which in the US is measured by "Maximum Incremental Reactivity ("MIR") in relation to ethane. In this regard, the selection of blowing agents can have a MIR of less than that of ethane, and therefore will be VOC-exempt in the US. In some aspects, the selected blowing agent can be a "SNAP" acceptable blowing agent as such regulation was defined prior to 2017 namely, HFC-152a, hydrocarbons (e.g., pentane, isobutane, etc.), carbon dioxide, water, methylal, methyl formate, HCFC-123, HFO-1234ze(E), HFO 1336mzz(Z), or HFO 1233zd(E).

A class of liquid blowing agents that can be used in some implementations is HFCs. Many HFC fluids share the disadvantage of having relatively high GWPs, and today, and in the future, it may be desirable to use hydrofluorocarbon or other fluorinated fluids having as low global warming potentials as possible while maintaining the desired performance in use properties. While some of the HFC materials exhibit a lower GWP, for example, HFC-245fa (Enovate® 254fa), HFC-134a (Formacel® Z-4, Chemours), and others, relative to other HFCs, the use of HFCs as blowing agents in foam insulation, particularly rigid foam insulation, may result in HFCs being less desirable candidates for blowing agents in use cases, such as commercial insulation. However, under the Kilgari Amendment to the Montreal Protocol, HFCs such as HFC-134a will be permitted for the next several years in the US and other countries, albeit at decreasingly lower levels. To the extent that a particular use case indicates the selection of HFCs, such blowing agents are contemplated for use with the aromatic polyester polyether polyols herein.

In regards to selection of HFC to generate desired physical properties, at least some HFCs exhibit relatively high intrinsic thermal conductivity properties (i.e., poor thermal insulation). Thus, for a selected use case where good insulation is a selected property, HFCs that exhibit low insulation properties would be contraindicated. On the other hand, foams made with certain of the HFC blowing agents, such as HFC-245fa (Enovate® 245fa) have been seen to provide improved thermal insulation, which is believed to be due in part to the low thermal conductivity of HFC-245fa vapor, and in part to the fine cell structure HFC-245fa imparts to the foams. To this end, HFC-245fa has been widely used in insulation applications, particularly refrigerator, freezer, refrigerator/freezer and spray foam applications. HFC-245a is also non-flammable according to the specifications of ASTM E-681, which makes it desirable for use in applications where fire behavior may be relevant.

Methyl formate (Ecomate®, Foam Supplies) has found application for polyurethane foam blowing agents; like hydrocarbons such as Exxsol® blowing agents, it works as an expansion agent. As set out in U.S. Pat. No. 6,753,357, the disclosure of which is incorporated herein in its entirety, methyl formate is suitable for generating very low density foams having fine cell structures. This blowing agent can be pre-blended with the aromatic polyester polyether polyols or added to as part of the reaction mixture.

Hydrocarbon blowing agents can also be applicable in certain situations. For example, U.S. Pat. No. 5,182,309, the disclosure of which is incorporated herein in its entirety, discloses the use of iso- and normal-pentane in various emulsion mixtures. Another example of hydrocarbon blowing agents is cyclopentane, as disclosed in U.S. Pat. No. 5,096,933, incorporated herein in its entirety. Although many hydrocarbon blowing agents, such as cyclopentane, and isomers of pentane, are zero ozone depleting agents and exhibit very low GWP relative to prior generations of blowing agents, for certain applications, these materials can be less desirable because foams produced from these blowing agents can lack the same degree of thermal insulation efficiency as foams made with, for example, HFC-245fa blowing agent. Also, certain hydrocarbon blowing agents have inadequate miscibility with some polyester polyols commonly used to generate polyurethane foams. The poor solubility of hydrocarbons can also tend to lead to larger, coarser, or uneven cell structures in a resultant polyurethane foam. As is well known, the thermal conductivity of a foam generally increases with a poor cell structure. Therefore, it is useful that hydrocarbon be uniformly dispersed under constant agitation throughout the polyol mixture immediately prior to foaming in order to obtain a rigid polyurethane foam having the desired thermal insulation values. Accordingly, the use of certain HFCs can require a chemical surfactant to obtain a suitable mixture for storage. Alternatively, the polyester polyol may need to be mixed with the blowing agent immediately prior to mixture with the isocyanate in a polyurethane reaction. In some implementations, the lack of solubility and attendant poor shelf life of hydrocarbon-polyol mixtures has, to date, limited the ability of pre-formulating batches of the mixtures for use at a later time.

In one implementation, hollow microbeads comprising a physical blowing agent added alone or in combination with other blowing agents to the reaction ingredients for the foam coating. Such hollow microbeads are typically comprised of a shell made of thermoplastic polymer, with, in the core, a liquid, low-boiling-point substance based on alkanes, for example, isopentane. The production of these hollow microbeads is described by way of example in U.S. Pat. No. 3,615,972, the disclosure of which is incorporated herein in its entirety by this reference. Examples of suitable hollow microbeads are obtainable with trademark Expancel® from Akzo Nobel. When used, the amount added of the hollow microbeads is generally from about 0.25% to 5.0%, or from about 1.0% to 2.0%. As a non-limiting example, an aromatic polyester polyether polyol of about 24 pcf density can use about 1% by weight hollow microbeads on a weight percent basis of the total polyol:isocyanate mixture. An exemplary Expancel product is 031 DU 40. Also, the outer coating can provide some bulk to the foam. The '049 Application, previously incorporated by reference, provides a number of Example foams using Expancel.

HFO blowing agents have recently been introduced in the polyurethane industry, for example, HFO-1233zd(E) and HFO-1336mzz (Opteon® 1100, Chemours), which are designed for low GWPs and energy efficiency, such as low K-factor value. These newer HFOs only have atmospheric lifetime of weeks rather than years or decades. However, these new HFO blowing agents have not been shown to be stable with conventional additives in the polyurethane formulation and new ingredients may be required for HFO blown system. The inventor currently believes that such modifications are within the scope of normal experimental procedure. As with some types of HFCs, cells made with HFOs will incorporate blown gas into the cells to augment the insulating properties of the cells. Such entrained gas can also improve foam performance in characteristics such as yield, adhesion, and resistance to air and water. HFOs are also non-flammable and, as such, may be useful in applications where other blowing agents would be contraindicated due to their flammability. As a specific example, Opteon 1100 is reported to exhibit good solubility in polyester polyols, and has been reported to be a good replacement for some HFCs.

Aragonite, an oolitic sand, has been found by the inventor herein to provide benefits as a blowing agent. This material has a further benefit of also serving as a filler, as well as being generated from a sustainable source.

Water can also be selected as a blowing agent for some applications as a chemical blowing agent, which will typically provide an open cell or partially open cell foam. In this regard, when "water-blown" polyurethane foams are generated, water can be added to the aromatic polyester polyether polyols and isocyanate upon mixing. The water reacts with the isocyanate to form $CO_2$, which is the blowing agent. Water blown polyurethane foams can exhibit reduced insulating properties versus other types of blowing agents at least because generated $CO_2$ can diffuse out of the foam after the reaction is completed. The cells will re-pressurize with air, which has a lower insulating value. However, since water consumes isocyanate groups, an equivalent molar excess of isocyanate should be used to make up for the consumed isocyanates. Water can typically be found in minor quantities in the polyols as a byproduct and may be sufficient to provide the desired blowing from a chemically active substance. Water used as a blowing agent for use with aromatic polyester polyurethane polyols is described in US Patent Publication No. 20040162359, the disclosure of which is incorporated herein in its entirety.

The selection of the blowing agent can also be related to the cost profile indicated for an application. For example, in some situations, use of water as a blowing agent can result in increased raw material usage to achieve desired results versus another blowing agent at least because the density of water blown polyurethane foams is about 10% or greater than foams blown with some other types of blowing agents. Moreover, water blown foams can have a tendency to shrink substantially, for example, about 25% versus other blowing agents. Thus, to achieve a desired thickness, additional aromatic polyester polyether polyols might need to be used, which can affect the appropriateness of selection of water as a blowing agent for certain end uses. However, if lower quality foams, for example, are indicated for a particular use case, the aromatic polyester polyether polyols amount used may not need to be increased. For example, if insulation value or foam density is not a primary performance goal, water may be an appropriate blowing agent for use.

Use of water as a blowing agent can also result in the generated polyurethane foams having lower adhesion, perhaps because of the increased friability of the foam. However, for some use cases, strong adhesion will not be a desirable property or may be contraindicated, so water may be an appropriate blowing agent for selection in a particular use case. Moreover, the characteristics of water as having 0 GWP and generating 0 VOCs in use can provide for the desirability of this material as a blowing agent in some implementations, especially when combined with the recyclable/sustainable characteristics of the aromatic polyester polyether polyols of the present disclosure.

$CO_2$ can also be used as a blowing agent in some implementations. As would be appreciated, $CO_2$ is inert, low cost, and has very minimal GWP. Moreover, $CO_2$ exhibits solubility in polyols, which can enhance its appropriateness as a blowing agent for polyurethanes, in some implementations. $CO_2$ can be metered into the reactants, typically the polyol, at the time of the reaction. Polyurethane foams made with $CO_2$ can exhibit very low densities when appropriate manufacturing conditions are used.

In further implementations, the blowing agent that is not water can be utilized in an amount of from about 1 to about 20, about 1 to about 15, about 5 to about 15, about 5 to about 10, or about 8 to about 10, parts by weight, each based on 100 parts by weight of the aromatic polyester polyether polyols.

In some implementations, water is introduced into the polyol composition in amounts of from about 0.02 to 5 weight percent, preferably from 0.05 to 4 parts by weight, based on 100 parts by weight of the aromatic polyester polyol.

Typically, the amount of the blowing agent and/or water is selected based on a desired density of the foamed polyurethane compositions and the solubility of the blowing agent in the reactive components.

Blends of blowing agents have been used recently to address various formulation and performance needs in response to the delisting of blowing agents for environmental reasons. In this regard, US Patent Publication No. US20160200889, the disclosure of which is incorporated herein in its entirety, discloses polyurethane foams made with a blowing agent that is a mixture of water, hydrocarbon and HFO to prepare a polyurethane panel foam.

The blowing agent can, independently, be added to either or both of the aromatic polyester polyether polyol or the isocyanate component. In some aspects, when the hollow microbeads are used as a physical blowing agent the inventors herein have determined that it can be advantageous to add the microbeads to the isocyanate component, at least because the microbead coating may be partially soluble in the aromatic polyester polyether polyol, thus reducing the stability—and resulting foam coating characteristics—of the polyol component. Additionally, heating of the aromatic polyester polyether polyol, as discussed further herein, so as to facilitate flowability can approach the melting point of the coating which, again, would affect the pre-reacted aromatic polyester polyether polyol, as well as the resulting foam coating properties.

Surfactants can be added to the aromatic polyester polyether polyols itself or into a formulation of polyol and blowing agent. While surfactants can be indispensable in PU foam manufacture, especially for the low-density varieties at least because the reduce the work required to increase the cell interfacial area, allow reduction of the cell size and control of the structure and enhancement of the foam stability. Surfactants can play a significant role at each stage of PU foam formation by: 1. facilitating the thorough mixing of the PU foam mixture components; 2. stabilizing the bubble nuclei in a liquid reaction mixture, preventing the bubbles from coalescing to form large size bubbles; 3. facilitating the control over the fluidity of the polymerizing liquid mixture in the expansion process as a result of bubble growth; 4. allowing tight control of the time and degree of opening of the cell structure of the foams produced. Moreover, surfactants can improve the solubility of the blowing agent in the aromatic polyester polyether polyols. Suitable surfactants can be identified by one of ordinary skill in the art without undue experimentation. As non-limiting examples, they can take the form of polydimethylsiloxane-polyoxyalkylene block copolymers, silicone oils, nonylphenol ethoxylates, and other organic compounds. Other surfactants include, but are not limited to, polyethylene glycol ethers of long-chain alcohols, tertiary amine or alkanolamine salts of long-chain alkyl acid sulfate esters, alkyl sulfonic esters and alkyl arylsulfonic acids. Such surfactants can be employed in amounts sufficient to stabilize the foaming reaction mixture against collapse and the formation of large, uneven cells. In one implementation, about 0.2 to about 5 parts of the surfactant per 100 parts by weight aromatic polyester polyether polyols can be sufficient for this purpose. Such surfactants can enhance the wettability of the applied mixture to, in some implementations, improve adhesion of the applied coating or foam to the substrate.

The isocyanate-reactive component may be entirely or in part pre-blended before mixing with the isocyanate component (i.e., may be mixed before reacting with the isocyanate component). In implementations, at least the polyol component, the catalyst component, optional surfactant, and the blowing agent component are pre-blended and supplied as a pre-mix, e.g., for ease of manufacturing in that the mixture can be shipped and stored for use as needed. Compatibility with the isocyanate-reactive component will then be important in the selection of formulation components and reaction condition to generate the desired foam end properties (e.g., compatibility between the polyol component and the catalyst component, compatibility between the polyol component and the blowing agent component, and/or compatibility between the catalyst component and the blowing agent component, etc.).

For example, compatibility between the catalyst component and the blowing agent component and/or the polyol component may have an effect on the resultant polyurethane products. By way of an example, since catalyst assisted polymerization occurs when forming a final polyurethane product (such as a rigid foam), if the catalyst has been deactivated upon storage, it will be not be able to assist in polymerization, the polymerization may not be complete and/or may take too long so as not to be commercially feasible. An incomplete polymerization may produce a low molecular weight polymer and/or leave unreacted isocyanate groups, which may lead to crosslinking by thermally induced reactions and/or reaction with water (or bubble formation leading to defects in an elastomer, adhesive, sealant, etc.). A slow polymerization may lead to a process that is commercially infeasible and/or an inferior product. Accordingly, implementations of the present invention relate to the use of a storage stable isocyanate-reactive component that allows for improved compatibility within the starting materials.

For example, by storage stable isocyanate-reactive component it may be meant that the component is be storable at room temperature and/or a higher temperature (such as from 35° C. to 80° C., from 35° C. to 60° C., from 39° C. to 51° C., from 40° C. to 50° C., at 40° C., at 50° C., etc.) for a period of at least 10 days (e.g., from 1 day to 10 days, from 1 day to 14 days, from 1 day to 49 days, from 1 days to 50 days, from 1 days to 100 days, etc.) without a substantial change (i.e., less than 10 seconds) in gel time when the storage stable isocyanate-reactive component is reacted with an isocyanate component (e.g., at room temperature of 21±2° C.) to form a polyurethane product. According to exemplary implementations, the storage stable isocyanate-reactive component a mixture of aromatic polyester polyether polyol and, optionally, one or more cell size regulators, blowing agents, catalysts, etc.) is storable at room temperature, a higher temperature of 40° C., and/or a higher temperature of 50° C. for a period of at least 10 days with no more than 6 seconds in gel time when reacted with the isocyanate component at room temperature. For example, the isocyanate-reactive component is storable at 50° C. for a period of from 1 day to 14 days with a less than 6 second change in gel time when reacted with the isocyanate component at the isocyanate index from 100 to 150, compared to when the same isocyanate-reactive component is stored for the period of less than 1 day at room temperature and reacted with the same isocyanate component at the same isocyanate index from 100 to 150.

Further, implementations relate to polyurethane products that may be formed at a low cost, e.g., with respect to components such as the catalyst component and/or processing costs. Accordingly, the use of the storage stable isocyanate-reactive component may reduce the cost and/or time involved in manufacturing polyurethane products such as rigid polyurethane foams.

When some types of blowing agents are used, a variation of the following procedure can be used to generate the polyurethane foams. In various implementations, the foamed polyurethane polymer can be prepared by mixing the reaction components at room temperature or at a temperature slightly above room temperature for a short period of time (e.g., less than about 10 seconds or less than about 1 second). In some implementations, the isocyanate reacting mixture and the blowing agent may be mixed prior to or upon addition to the isocyanate component, for example shortly before the reaction is to be conducted. This procedure can be useful for aromatic polyester polyether polyols mixtures that do not readily create storage stable polyol-blowing agent mixtures. Other additives, including catalysts, flame retardants, and surfactants, may be added to the isocyanate reacting mixture prior to addition of the blowing agent. Mixing may be performed in a spray apparatus, a mix head, or a vessel. Following mixing, the mixture may be sprayed or otherwise deposited onto a substrate or into an open mold. Alternatively, the mixture may be injected inside a cavity, in the shape of a panel or otherwise. This cavity may be optionally kept at atmospheric pressure or partially evacuated to sub-atmospheric pressure (i.e., up to about −50 kPa). Such a panel procedure is disclosed in US Patent Publication No. 2016/0200889, the disclosure of which is incorporated herein in its entirety. Upon reacting, the mixture takes the shape of the mold or adheres to the substrate to produce a polyurethane polymer which is then allowed to cure, either partially or fully.

Suitable conditions for promoting the curing of the polyurethane polymer include a temperature of from about 20° C. to about 150° C. In some implementations, the curing is performed at a temperature of from about 35° C. to about 75° C. In other implementations, the curing is performed at a temperature of from about 45° C. to about 55° C. In various implementations, the temperature selected for curing may be selected at least in part based on the amount of time required for the polyurethane polymer to gel and/or cure at that temperature. Cure time will also depend on other factors, including, for example, the particular components (e.g., catalysts, ambient temperature and humidity, etc.), and the size and shape of the article being manufactured.

The resulting polyurethane foam can comprise a compressive strength of at least 130 kPa, and a tensile bond strength of at least 130 kPa which makes it suitable for a rigid foam. Some implementations exhibit a compressive strength of at least 135 kPa and/or a tensile bond strength of at least 135 kPa. Further implementations exhibit a compressive strength of from about 130 kPa to about 160 kPa or from about 135 kPa to about 145 kPa and/or a tensile bond strength of from about 135 kPa to about 250 kPa or from about 135 kPa to about 155 kPa. The formulation that is used to produce the foam can have a minimum fill density of less than about 40 g/L, and a gel time of at greater than about 120 s at 20-22° C. The formulation may produce a foam having a minimum fill density of from about 16 g/L to about 40 g/L, from about 25 g/L to about 40 g/L or from about 35 g/L to about 40 g/L. The gel time may be from about 120 s to about 250 s at 20-22° C., from about 125 s to about 160 s at 20-22° C., or from about 130 s to about 145 s at 20-22° C.

Generation of foamed polyurethane composition can be via mechanical impingement spray of each of the foamed aromatic polyester polyether polyol component and the isocyanate components, as well as any additives, where such components are discussed further hereinafter. Still further, polyurethane generation can be by dynamic mixing methodologies, pouring into or onto a mold, pultrusion, or other suitable methodologies, as appropriate for a specific implementation.

In one aspect, the present disclosure comprises a polyurethane derived from an aromatic polyester polyether polyol where the polyurethane exhibits strong adhesion in an in situ polymerization process—that is, is cured-in-place—to a number of surface configurations, as discussed in more detail hereinafter When fully cured-in-place on a substrate surface, the adhesive strength of the foamed polyurethane composition is such that, for a number of substrates, the adhesive bond between the substrate and the cured-in-place polyurethane coating is greater than the internal strength of the substrate itself. In this regard, the internal bonds in the substrate itself will break or fracture before the adhesive bond fails between the substrate and the polyurethane. For example, when cured-in-place on a wooden board and a pulling force is applied to attempt to separate the foamed polyurethane from the substrate, the wood itself will break apart, and therefore fail, before the polyurethane coating pulls away from the surface of the board.

The aromatic polyester polyether polyols are believed by the inventors herein to provide surprisingly efficient wetting to a wide variety of surfaces relevant to a number of industries and applications. Without being bound by theory, it is believed that at least some of this wettability is conferred by at least the terephthalic moieties in the PET. This can, in turn, increase the overall contact of the polyol on a surface prior to substantial gelling of the aromatic polyester polyether polyoliisocyanate mixture on the substrate surface, as well as prior to substantial completion of the curing which, in turn, improves the adhesion of the cured-in-place polyurethanes to the substrates.

The inventors have determined that, when cured-in-place on a substrate, the fully cured foamed polyurethane composition exhibits a surface hardness, which can be termed "impact resistance," that is surprising for a polyurethane coating that also exhibits strong adhesion to substrates. Indeed, the cured-in-place polyurethane coatings provide a surprising amount of structural strength to a variety of useful materials, as shown in the Examples hereinafter.

In a further aspect, the disclosure comprises useful materials derived from the foamed polyurethane compositions. In this regard, the foamed polyurethane materials, in some implementations, exhibit exceptional mechanical properties as compared to prior art counterparts. For example, whether used as a coating on a substrate or to generate useful materials, the cured polyurethane composition exhibits a high degree of Shore D hardness, abrasion resistance, and impact resistance. The foamed adhesive polyurethane compositions also exhibit a significant degree of screw and nail retention, thereby making them desirable for use in construction and building applications, as discussed further herein. The thermal behavior of the foamed polyurethane compositions is excellent, at least because of the presence of aromatic functionality therein.

Still further, the foamed polyurethane compositions are paintable or tintable. The compositions also can be texturized, embossed or the like. As such, the foamed compositions can impart decorative effects to building surfaces coated therewith.

Additives that can be added to the foamed aromatic polyester polyether polyol after the substantial completion of the PET transesterification step but before the addition of isocyanate to generate the polyurethane can include, but are not limited to, chain terminators, inert diluents, amines, anti-foaming agents, air releasing agents, wetting agents, surface modifiers, waxes, inert inorganic fillers, molecular sieves, reactive inorganic fillers, non-reactive fillers (e.g., flyash, mica, pigments, wood particles), chopped glass, glass fibers, steel wool, steel shavings, processing additives, surface-active agents, adhesion promoters, anti-oxidants, dyes, pigments, ultraviolet light stabilizers, thixotropic agents, anti-aging agents, lubricants, coupling agents, solvents, rheology promoters, anti-oxidants, anti-UV agents, colorants, and combinations thereof. Additives may be utilized in amounts that can be determined by one of ordinary skill in the art according to formulation principles associated with the coatings and foams herein.

As noted, polyurethane materials of the disclosure herein can be formulated with materials derived, at least in part, from renewable and/or recyclable/sustainable content. In this regard, "renewable" or "sustainable" refers to matter that is provided by natural processes or sources. The total recycled and/or renewable/sustainable content of the polyurethane component (based on the polyols and isocyanates, which in some implementations, may include filler materials) can be greater than about 5%, or about 10%, or about 15%, or about 20%, or about 25%, or about 30%, or about 35%, or about 40%, or about 45%, or about 50% based on the total weight of polyurethane composition on a weight % basis. Such renewable/sustainable material can be derived from the aromatic polyester polyether polyol component, glycerin and/or from the use of filler materials. The total recycled and/or renewable/sustainable content in the foamed polyurethane can comprise a range that can be defined by selection of two of the referenced percentages.

Further description of the polyurethane materials, implementations, and applications are described in detail hereinafter.

The catalyst used to accelerate the reaction between the polyol and the isocyanate can include an organometallic catalyst, an amine catalyst, or a combination thereof. An organometallic catalyst, for example, can include dibutyltin dilaurate, a lithium carboxylate, tetrabutyl titanate, a bismuth carboxylate, or any combination thereof. In some implementations, such as when an HFO blowing agent is used, stability of the aromatic polyester polyether polyols can be extended by use of certain amine catalysts such as Polycat® 203 and Polycat® 204 (AirProducts), which have been shown to be useful with both HFO-1233zd(E) and HFO-1336zz in High Pressure Spray Foam Applications (SPF). For example, it has been reported that the Polycat 204 catalyst can generate achieve from 6 to 8 months of polyol blend stability when used with HFO-1233zd(E). It has further been reported that Polycat 203 catalyst performs similarly to Polycat 204 catalyst, but also adds the advantage of having a low water content, providing additional flexibility in formulating.

The amount of aromatic polyester polyether polyol to isocyanate can vary according to the amount of hydroxyl functionality available to react with the isocyanate moieties. In regards to the disclosed aromatic polyester polyether polyols, higher ethoxylation levels on the trimethylolpropane and the glycerin can result in a lower amount of hydroxyl functionality. It should be appreciated that the measured hydroxyl functionality in a given foamed polyol material may be indicative of both PET-containing hydroxyl moieties, as well as any hydroxyl moieties contributed by other materials, such as ethylene glycol generated in the transesterification reaction that was not removed, for example. For the 5 moles of ethoxylation example, the amount of aromatic polyester polyether polyol to isocyanate can be from about 1:1 or about 0.95:1 or about 1:0.95 on a volume:volume ratio of reactive moieties in each component. The amount of materials as a function of hydroxyl functionality and isocyanate functionality can readily be determined by one of skill in the art. As would be recognized, additives that can be added to either the polyol or isocyanate can result in a variation of the volume ratios to generate the appropriate reaction ratios, and such variations can be determined by one of ordinary skill in the art.

The polyurethane composition can be prepared by either the "one-shot" or the "prepolymer" approach. In the former, all ingredients are mixed simultaneously, along with catalysts, foaming agents, fillers, plasticizer, and cured-in-place on the substrate or, for the building materials, in a mold, sprayed via a dynamic mixer, on a pultrusion line, etc. Such systems are generally of two components, consisting of an A component, being the di- or polyisocyanate, and a B component, being the polyol(s) with any other desired active hydrogen material, catalyst(s) and any other ingredients. In the prepolymer approach, an isocyanate-terminated prepolymer is first prepared by reacting excess diisocyanate with a polyol. The curing involves the reaction of the prepolymer (A component) with a chain extender (B component), which will comprise the aromatic polyester polyether polyol of the disclosure. The prepolymer approach can be useful when the polyurethane composition is being generated in the field or on a job site, as this method can provide a more controlled reaction/curing process, for example.

As indicated, a significant feature of the present disclosure is a strong adhesion generated between the foamed polyurethane composition and a variety of substrates. Indeed, the present disclosure exhibits previously unseen utility in an industry in which adhesives have generally been formulated with specific end uses in mind, as opposed to a "universal" or "multi-functional" adhesive being available. In this regard, and as discussed previously, the cured-in-place adhesive bond will be stronger than the internal strength of the substrate to which it is applied for substrates like OSB, FRP, gypsum drywall, as well as other materials. The exceptional adhesive strength of the foamed polyurethanes shows wide utility for a number of substrate materials as discussed further herein.

Without being bound by theory, the inventors herein believe that the exceptional adhesion exhibited by the foamed polyurethane composition shown in some implementations is, at least in part, conferred by the use of terephthalate segmented polyols derived from the PET transesterification from use of glycerin and/or trimethylolpropane have the degree of ethoxylation set out previously, namely 1 to 9, or any amount of within this range, moles of ethoxylation. Adhesion would be appreciated to be, at least in part, a function of surface energy. In the present disclosure, and without being bound by theory, enhancement of surface energy is believed to be generated, at least in part, by ether linkages as provided by ethylene oxide adducts imparted by the ethoxylation of glycerin or trimethylolpropane. Adhesion can also be influenced by the polarity of the molecule, which can also be provided by the PET-derived polyols, as discussed above. Moreover, the aromatic character of the polyester polyols is also believed to impart at least some additional hydrophobicity in the polyester polyols, thus conferring both hydrophobic and hydrophilic character to the resulting polyol. The inventors hypothesize that such dual functionality can enhance the miscibility of the foamed aromatic polyester polyether polyol in the isocyanate component, and may positively influence the adhesive characteristics of the resulting polyurethane composition. Such adhesion is believed to be further augmented by the curing in place, or "in situ" polymerization, feature of the present disclosure.

In various aspects, the coating or foam may also comprise a flame retardant additive. Such additive can be selected from the group of phosphorous, halogens, and combinations thereof. In some aspects, it may be beneficial to not incorporate organo-halogen or organo-phosphorus flame retardants due to their status as persistent organic pollutants that are believed to generate negative environmental and health effects.

As a general matter, and irrespective of the environmental and health effects, a wide variety of flame retardants can be contemplated. Such include, but are not limited to, red phosphorus, ammonium polyphosphate, tris(2-chloroethyl) phosphate, tris(2-chloropropyl)phosphate, tetrakis(2-chloroethyl)ethylene diphosphate, dimethyl methane phosphonate, dimethylpropanephosphonate, diethyl diethanolaminomethylphosphonate, and combinations thereof. In another implementation, the conventional flame retardant additive is selected from the group of tricresyl phosphate, tris(2-chloroethyl)phosphate, tris(2-chloropropyl)phosphate, tris(2,3-dibromopropyl)phosphate, red phosphorous, aluminum oxide hydrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, di bromoethyldibromocyclohexane, expandable graphite or cyanuric acid derivatives, melamine, and corn starch. Additionally, other flame retardant additives are also contemplated for use in the present disclosure including, but not limited to, hydrated aluminum oxide, calcium sulfate, expanded graphite, cyanuric acid derivatives, and combinations thereof. In some implementations, the flame retardant does not comprise a brominated material.

The flame retardant additive amount and type can be determined, in part, by the needed flammability properties of the low molecular weight ethoxylated triol used in the transesterification reaction. In this regard, trimethylolpropane can, in some circumstances, exhibit more flammability than for a polyol derived from ethoxylated glycerin. Therefore, the amount of flame retardant additive used can be more than that needed for a glycerin-derived aromatic polyester polyether polyol, which is believed to exhibit lesser flammability tendency than for a polyol derived from ethoxylated trimethylolpropane. The amount of flame retardant additive will nonetheless be a function of the specifications for the material being generated including the foamed polyurethane, as well as the specifications of the finished structure in which the material is being utilized. Generally, the amount of flame retardant additive used is from about 0.1 to about 10% or about 1% to about 8% or about 1 to about 5% of the total weight of the polyurethane coating.

In certain aspects, the foamed polyurethane composition can be substantially free of flame retardant additives, yet exhibits flame retardance appropriate for the intended application. In this regard, polyurethane coatings and foams will exhibit some degree of flame retardancy by virtue of their chemical makeup, at least because of the presence of aromatic groups in the polyurethane composition and, optionally, because the use of ethoxylated glycerin as a transesterification agent. When the foamed polyurethane compositions are applied as a coating to a substrate that is inherently flame retardant, for example gypsum wall board or concrete, flame retardant additives may not be required, or a lesser amount may be indicated.

In further aspects, fillers can be added during the fabrication process. For example, fiberglass chop can be incorporated along with Part A (isocyanate) and Part B (polyol component) to generate a polyurethane coating composition that exhibits enhanced structural strength. Yet further, the filler can be mixed together with the A and B parts at an application event. Other strength enhancing fillers are also contemplated, as discussed hereinafter.

The method of generating the foamed polyurethane comprises the steps of introducing the foamed aromatic polyester polyether polyol and the reactive isocyanate components via spraying using a mixing head to provide contact therewith on the substrate onto which the coating or foam is to be formed on and durably adhered to. Dynamic or static mixing heads can be used in the application. Impinging mixing heads can also be used. In various aspects, the application steps are facilitated through use of a spray form proportioner device, such as a Graco® Reactor H-VR Variable Ratio Hydraulic Proportioner. Other devices that can suitably be used include the Nitrosys SPF low pressure sprayer. A Kornylak Dispensing apparatus can also be used.

To make a rigid polyurethane foam, a mixture generated from a dynamic mixing process can be prepared of a polyfunctional isocyanate, a polyol, a blowing agent, a catalyst, and, optionally, a cell-size regulator (e.g., a surfactant). In some aspects, the aromatic polyester polyether polyols, catalyst, and optional cell size regulator can be pre-formulated. Such pre-formulation will exhibit a storage stability that is appropriate for a particular use case, where such storage stability is as set out hereinabove.

A urethane-forming reaction begins once the ingredients are combined, at which time an exotherm forms, and the blowing agent or agents cause closed or open cells (depending on formulation and reaction conditions) to form in the polymer as the mass expands and solidifies. The exotherm typically reaches a peak temperature of at least about 150° F. The isocyanate and polyol reactants include enough molecules with functional groups that the degree of crosslinking or branching is sufficient to produce a rigid foam. In some aspects, the aromatic polyester polyether polyols of the present invention has a degree of isocyanate-reactive functionality of greater than 2.0, or greater than about 2.5 or more. Such functionality is significantly distinguishable from prior art aromatic polyester polyether polyols which exhibit a lower functionality, as discussed elsewhere herein.

Although rigid, the polyurethane foams of the present disclosure also can exhibit resiliency and flexibility, especially at triol ethoxylation levels of from about 5 to about 7 moles. The polyurethane foams also exhibit exceptional adhesion. For example, the foams have shown a tendency to adhere to a new Teflon® surface. In this regard, it may be beneficial to use a sacrificial coating when preparing the foamed foams in a mold etc.

The polyurethane can be applied at a point of manufacture (e.g., products to be sold with such coating at point of sale), or the coating can be applied a location (e.g., sprayed in place insulation or adhesive layers applied at a building site).

For some applications, such as coating of irregular surfaces, the components can be sprayed on the surface and be allowed to cure after green strength is achieved. A continuous process can be also used wherein the components are dispensed onto a continuous belt. The desired length of material can then be generated, and when green strength is acquired, the lengths can be moved to a curing station (e.g., racks) and allowed to cure for about 24 hours. Other application methods can be suitably used.

High or low pressures can be used to generate the polyurethane coatings. Pressure ranges can be from about 500 psi up to about 5000 psi, or from about 500, 1000, 1500, 2000, 2500, 3000, 3500, 4000, or 5000 psi, where any value can form an upper or lower endpoint, as appropriate. The specific psi value(s) for application can be determined by one of ordinary skill in the art without undue experimentation. Foam coatings are typically applied at lower pressures than film coatings.

In some implementations, each of the aromatic polyester polyol and the isocyanate can be pre-heated so that the individual components and the combined components are applied at a temperature that facilitates both flowability and reaction thereof. While considerably lower in viscosity to prior art aromatic polyester polyols, the dispensing of the polyols and reaction efficiency may be improved by at least some heating prior to contact with the isocyanate component. In this regard, each of the A side and B side components can be independently heated to from about 35 to about 95° C., about 45 to about 85° C., or about 50 to about 80° C. or up to about 90° C. Such heating may be used to reduce the viscosity of the materials and/or to accelerate the polymerization reaction and subsequent curing. In some aspects, the aromatic polyester polyether polyols and isocyanate components can have the same or different application temperatures. The pre-heating can be provided in or proximate to either or both the storage tanks or application device.

In some aspects, it can be advantageous to combine the aromatic polyester polyether polyol and the isocyanate at temperatures less than the expansion temperature of the blowing agent. Without being bound by theory, the inventors hypothesize that by allowing the aromatic polyester polyether polyol and the isocyanate to combine at this lower temperature, the curing reaction between the aromatic polyester polyether polyol and the isocyanate can at least partially commence prior to the expansion of the blowing agents. It is believed that such initial curing can, in some aspects, enhance the resulting adhesion of the foam coating to a representative building substrate. Moreover, screw and nail retention improvements are observed (e.g., the punctured foam appears to be "self-healing"), possibly because of at least some gelation of the aromatic polyester polyether polyol and isocyanate components prior to expansion of the blowing agent. To this end, photomicrographs of the adhered foams illustrate locally oriented polyurethane foam layers surrounding the expanded microspheres. FIG. 1 is a photomicrograph of an foamed foamed composition 100 having expanded microsphere 105 embedded in polyurethane 110.

Density of the polyurethane foams are generally a very useful parameter, with lower density closed cell foams being desirable for insulation. Higher density closed cell foams tend to be useful for cushioning, such as to provide floor coverings, mattresses and the like. Open cell foams do not generally provide much insulation, but they can be cushioning by, for example, creating lightweight bulk. In some aspects, the density of polyurethane foamss can be about 2, 5, 10, 15, 20, 25, 30, 35, 40, 45 or 50 pounds per cubic foot, where any value can form an upper or a lower endpoint, as appropriate. The cells can be open or closed or a combination thereof.

One or more additional fillers can be used in the polyurethane materials of the present disclosure. The polyurethane compositions can incorporate fiberglass or other types of binding fibers or carbon particles or fibers, where such fillers can be selected to generate desirable end properties. Fillers can also reduce the amount of material needed in a particular application. Examples of such bulking fillers useful ash such as those produced by firing fuels including industrial gases, petroleum coke, petroleum products, municipal solid waste, paper sludge, wood, sawdust, refuse derived fuels, recycled materials, switchgrass or other biomass material. The one or more additional fillers can also include ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; aragonite, bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

The amount of filler material used, will be dependent, at least in part, on the intended end uses of the compositions and products using the compositions. Thus, the selection of the type and amount of filler can be an aspect of this disclosure. The inclusion of fillers can modify and/or improve the properties of the foamed polyurethane compositions, as well as any materials with which the foams are used. In particular, high filler loading levels can be used in the structural foam materials described in detail in the '049 Application without a substantial reduction of (and potentially with an improvement in) the intrinsic structural, physical, and mechanical properties thereof. In other words, the materials can be used in applications where load-bearing properties are desirable.

The surface of the foamed polyurethane compositions are paintable upon completion of curing. The polyurethane compositions can also be tinted with pigments to provide a colored polyurethane material upon completion of curing.

Decorative features can be added to give the outer foam surface a "faux look." In this regard, a wood grain surface can be generated. Yet further, a stucco-like surface can be generated. Still further, a textured surface can be generated. Prior to completion of curing, patterns, such as those associated with brick or masonry look can be embossed into the surface. When combined with the paintability or tintability of the foamed compositions, the usability of the coated substrates in interior or exterior construction applications where design is a point of materials selection can be enhanced. Perforations can also be incorporated into the foamed coating, so as to increase the acoustical characteristics of the substrate.

The foamed polyurethane materials of the present disclosure not only provide excellent adhesive performance in a variety of use cases that is comparable to or better than many polyester resins, these materials are styrene-free. Resins presented herein are also partially derived from biologically renewable resources and recycled materials, surprisingly without showing a decrease in performance. In this regard, the present disclosure provides adhesive systems that are styrene-free and that are low in VOCs and, as such, exhibit low GWP. Significantly, the foamed resin systems are at least partially derived from recycled sources and, when ethoxylated glycerin is used, the resins have a sustainable component. Recyclable or sustainable fillers can also be used. Thus, the foamed materials are significantly more "green" than possible with previous resin systems where strong adhesion to a variety of surfaces is desired.

The foamed polyurethane foams systems can be used to replace styrene-containing polyester resins that are used to generate composite systems. The inventors herein have surprisingly found that the polyurethanes of the present disclosure can wet out fiberglass and other filler materials quickly and efficiently. In one example of such an application, the polyurethanes of the present disclosure can be used to prepare laminated panels for motor homes, recreational vehicles, and trailers, as disclosed in US Provisional Patent Application No. 62/722,874, previously incorporated by reference. To briefly summarize that application, a gel coat can be applied to a belt or a mold and the foamed polyol and isocyanate are mixed by spraying in the presence of chopped fiberglass, and allowed to cure to generate a strong, lightweight composite sheet material that is resistant to water infiltration and cracking. When combined with the substantial elimination of VOC generation in manufacturing, the disclosure described in the referenced application is a significant improvement over the methodologies used today. While this specific application uses a fiberglass filler material, other fillers are contemplated to generate composite sheet materials can be using this technique.

In a further implementation, the present disclosure can be used to prepare structurally-strong molded materials that are filled appropriately for the desired use case. For example, fiberglass fillers can be used to generate composite structures that are suitable for use in vehicles, such as for the molded portions of recreational vehicles, boat hulls, shower stalls, bathtubs, pool shells, among other things. Carbon fibers can be used to generate lightweight and strong composite structures for aircraft parts. Still further, other fillers can be used as discussed elsewhere herein.

Yet further, the filled polyurethanes can be formed as sheets, with a decorative outer layer, or both layers can be decorative. Such materials can be used as walls for vehicles such as motor homes, trailers, and rail cars, among other things. In some implementations, a vehicle comprising such sheet materials provide insulative characteristics.

Still further, the foamed aromatic polyester polyether polyols can be used as components in epoxy adhesives. The aromatic polyester polyether polyols can be used as precursors for acrylate-based adhesives.

The present disclosure also relates to substrates having the foamed polyurethane composition material adhered to one or more surfaces thereof. The strong adhesion to a variety of surfaces including, but not limited, to building and construction-related surfaces, as well as the one or more excellent physical properties exhibited by the cured-in-place implementations can allow the foamed polyurethane compositions operate effectively as a nearly universal adhesive material. While some exemplary configurations of the specific composite substrates are discussed further hereinafter, generally, the substrate coated with the foamed compositions can comprise any material. In non-limiting examples, the foamed compositions can be adhered to wall material, roofing material, flooring material, gypsum wallboard, OSB board stock, plywood, lumber, cement cladding/siding, rigid foam, flooring material, extruded polystyrene, expanded polystyrene, concrete, wood planking, steel, aluminum, polyiso insulation, fiberglass, HDPE, MDPE, LDPE, fabric, paper, paperboard, MDF, plastic, cellulose materials, among other things. The foamed polyurethane compositions herein are contemplated to provide enhanced physical properties when cured-in-place on each of the substrates.

The composite substrates of the present disclosure can comprise the foamed polyurethane coating that is generated via in situ polymerization of the aromatic polyester polyether polyols, optional cell-size adjusters, and isocyanate on a surface of the substrate. The foamed polyurethane coating is durably attached to one or more surfaces of the substrate substantially by the exceptional adhesive properties of the polyurethane composition, and not by use of any secondary adhesive or tie layer.

The foamed polyurethane coating can be applied to one or both sides of a substrate, thereby providing a substrate having the foamed polyurethane material adhered thereon. Yet further, the foamed polyurethane coating can be included as an internal sandwich layer between two substrates, wherein the interior side of each substrate is adhered to the polyurethane coating. The adhered substrates can be the same or different in such a sandwich structure.

In one implementation, the mixture can be applied to the substrate surface in a single application. In a further aspect, the mixture can be applied in two applications, whereby this implementation incorporates a first application to the surface as a light base coating, allowed to cure for about 1 or 5 or 10 minutes, and then a second application is provided as a complete application. The first application can enhance adhesion of the layer or coating to the substrate surface.

Overall, the foamed coatings are generally about 80% or about 90% or about 95% cured within about 1 or 2 or about 6 hours to generate "green strength," and will be totally cured in about 12, 24 or 36 hours or up to about one week when the composite material is maintained at conditions from about 50° F. to about 110° F.

As indicated elsewhere herein, the use case and the polyurethane foams foam properties associated therewith (including the features of the raw materials used), can be incorporated into the selection aspect of the disclosure. As would be appreciated, the R values of the polyurethane foams will vary as a function of the thickness of the foam itself, as well as the blowing agent used, the cell size, cell quality, cell type, among other things. In some implementations, the desired R value for the polyurethane foam is selected, and the various aspects needed to obtain that R value are selected, where the blowing agent can also be selectable as a function of the desired environmental characteristic thereof. The overall environmental profile of the foam can also be selectable, such as when the polyol aspect is definable by the amount of recycled/sustainable content therein. The flammability characteristics of the foam can also be selected, as well as other relevant characteristics, such as compression strength, tensile strength, adhesion, etc.

The '049 Application, previously incorporated by reference provides a detailed discussion of various use cases for the foamed polyurethane foams comprised of the aromatic polyester polyether polyols. To summarize, the polyurethane foams of the present invention can be used for a wide variety of construction-type applications, including insulating foam panels, spray foam insulation, structural panels for walls, adhesive coatings, among other things.

The polyurethane foams of the present disclosure can also be used as structurally strong, as well as fire resistant, linings for pipes, duct work, pipelines etc. For example, a damaged pipe can be sprayed to fill and cover any parts that are cracked, frayed, etc. Yet further, a pipe can be coated with prior to use to reduce the possibility that the pipe will become damaged in use. The polyurethanes of the present disclosure can also be used for aerospace applications, for example. In this regard, the materials have been shown to wet out carbon materials (e.g., fibers) that are commonly used in generating components for aerospace products.

The materials of the present disclosure can also be used in insulative applications, such as for lining of trailers, railcars, etc. to allow temperatures to be maintained within a desired range. For example, for transportation of products through hot or cold areas, a temperature can be maintained at above freezing, or above about 40° C. and below about 110° C., or below about 105° C., even though the exterior temperature is below or above a temperature at which damage may result to the product being transported therein. Such insulative properties are accompanied by the structurally strong properties of the foamed polyurethanes, thus providing additional benefits. The foamed material of the present invention can also be fabricated into coolers. The structural improvements can allow thinner sided products than what is needed for Styrofoam, while still generating a good R value for a number of uses, such as shipping perishable materials.

The materials of the present disclosure can be used to create structural components for vehicles (e.g., automobiles, busses, trucks, aircraft etc.) where structurally strong, but lightweight materials are indicated. For example, the materials can be used to generate seating components and panels for aircraft. Panels and parts for automobiles can also be made from the foamed composition.

Yet further, the materials can be used to in sporting applications, such as in the fabrication of surfboards, skateboards, helmets, snow and water skis, portable dance floors, and the like.

The foamed polyurethane materials can also be used in medical applications such as, X-ray and diagnostic tables, in medical devices, prosthetic devices, casings for instrumentation, or the like.

The foamed polyurethane materials can be used for carpet backings, as well as to generate flooring in the form of rolls, tiles, rugs, or the like.

The foamed polyurethane materials can be used for acoustic foam, such as in sound-deadening applications.

The foamed materials herein can be used for packaging. For example, the foam can be extruded and cut to provide "packing peanuts." Flexible polyurethane foam is another material commonly used in protective packaging applications. Polyurethane foams can be characterized by an open cell construction and have a softer feel, especially in the lower density and firmness ranges. They are most often the material of choice for smaller, lighter, and more shock-sensitive products.

It will be apparent to those skilled in the art that various modifications and variations can be made in the present disclosure without departing from the scope or spirit of the disclosure. Other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method of generating a polyurethane foam material comprising:
   a) selecting a use case for a polyurethane foam material;
   b) providing an aromatic polyester polyether polyol material having the structure that is either:
      i) based on a glycerol backbone, the structure represented by a formula:

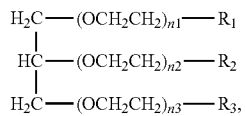

wherein each of $R_1$, $R_2$, and $R_3$ is independently selected from hydroxyl and a structure represented by a formula:

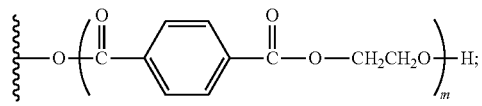

provided that at least one of $R_1$, $R_2$, and $R_3$ is not hydroxyl; wherein m has a value such that the polyol has a Brookfield Cone and Plate Viscosity of less than about 5 Poise carried out using Spindle #4 at 100 rpm and 60° C.;

and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9;

or ii) based on a trimethylolpropane backbone, the structure represented by a formula:

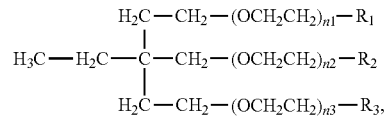

wherein each of $R_1$, $R_2$, and $R_3$ is independently selected from hydroxyl and a structure represented by a formula:

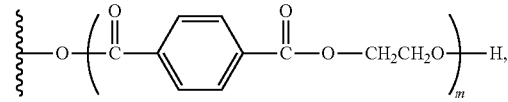

provided that at least one of $R_1$, $R_2$, and $R_3$ is not hydroxyl; wherein m has a value such that the polyol has a Brookfield Cone and Plate Viscosity of about less than about 5 Poise carried out using Spindle #4 at 100 rpm and 60° C.;

and wherein each of $n_1$, $n_2$, and $n_3$ is an integer independently selected from 0, 1, 2, 3, 4, 5, 6, 7, 8, and 9, provided that a sum of the values for $n_1$, $n_2$, and $n_3$ is 1 to 9;

c) selecting a blowing agent suitable for generating a polyurethane foam for the identified use case when the aromatic polyester polyether polyol material and blowing agent are combined with an isocyanate material under urethane reaction conditions;

d) combining the selected blowing agent, aromatic polyester polyether polyol material, optional cell size regulator, and the isocyanate material under urethane reaction conditions to form a mixture; and e) reacting the mixture under urethane reaction conditions to generate a polyurethane foam suitable for use in the selected use case.

2. The method of claim 1 wherein the aromatic polyester polyether polyol material consists essentially of the structure based on the glycerol backbone.

3. The method of claim 1, wherein the aromatic polyester polyether polyol material has a PET component derived from at least some recycled PET material.

4. The method of claim 1, wherein the aromatic polyester polyether polyol material has a PET component derived from at least about 50% recycled material.

5. The method of claim 1, wherein a cell size regulator is provided and comprises a surfactant.

6. The method of claim 1, wherein the method comprises providing the aromatic polyester polyether polyol material, the selected blowing agent and optionally a cell size regulator as a pre-mixture suitable for mixing with the isocyanate material immediately in the combination step.

7. The method of claim 1, wherein the cell size regulator is present, and the method comprises first mixing the aromatic polyester polyether polyol material and the cell size regulator, followed by combining the aromatic polyester polyether polyol material and cell size regulator mixture with the blowing agent.

8. The method of claim 1, wherein the selected use case is a foamed in place spray coated polyurethane insulation.

9. The method of claim 1, wherein the selected use case is a foamed insulation panel.

10. The method of claim 1, wherein the selected blowing agent has a GWP of less than about 100.

11. The method of claim 1, wherein the selected use case is an insulating panel.

12. The method of claim 1, wherein the selected use case is a sprayed on foam insulation.

13. The method of claim 1, wherein the selected use case is an adhesive foam coating.

14. The method of claim 1, wherein the selected use case is a packaging material.

15. The method of claim 1, wherein the selected use case is a flooring material.

16. The method of claim 1, wherein the selected blowing agent is one or more selected from the group consisting of HFO, hydrocarbons, HFCs, water, methyl formate, aragonite, or $CO_2$.

17. A polyurethane foam made by the method of claim 1.

18. The polyurethane foam of claim 17, wherein the polyurethane foam is closed cell.

19. The polyurethane foam of claim 17, wherein the polyurethane foam is open cell.

20. The polyurethane foam of claim 17, wherein the polyurethane foam has a density of less than about 15 psf.

* * * * *